Sept. 20, 1971                C. A. TUCKER ET AL            3,606,125
                    LEVER ACTUATED ROLL TOWEL DISPENSER
Filed Aug. 26, 1969                                  7 Sheets-Sheet 7
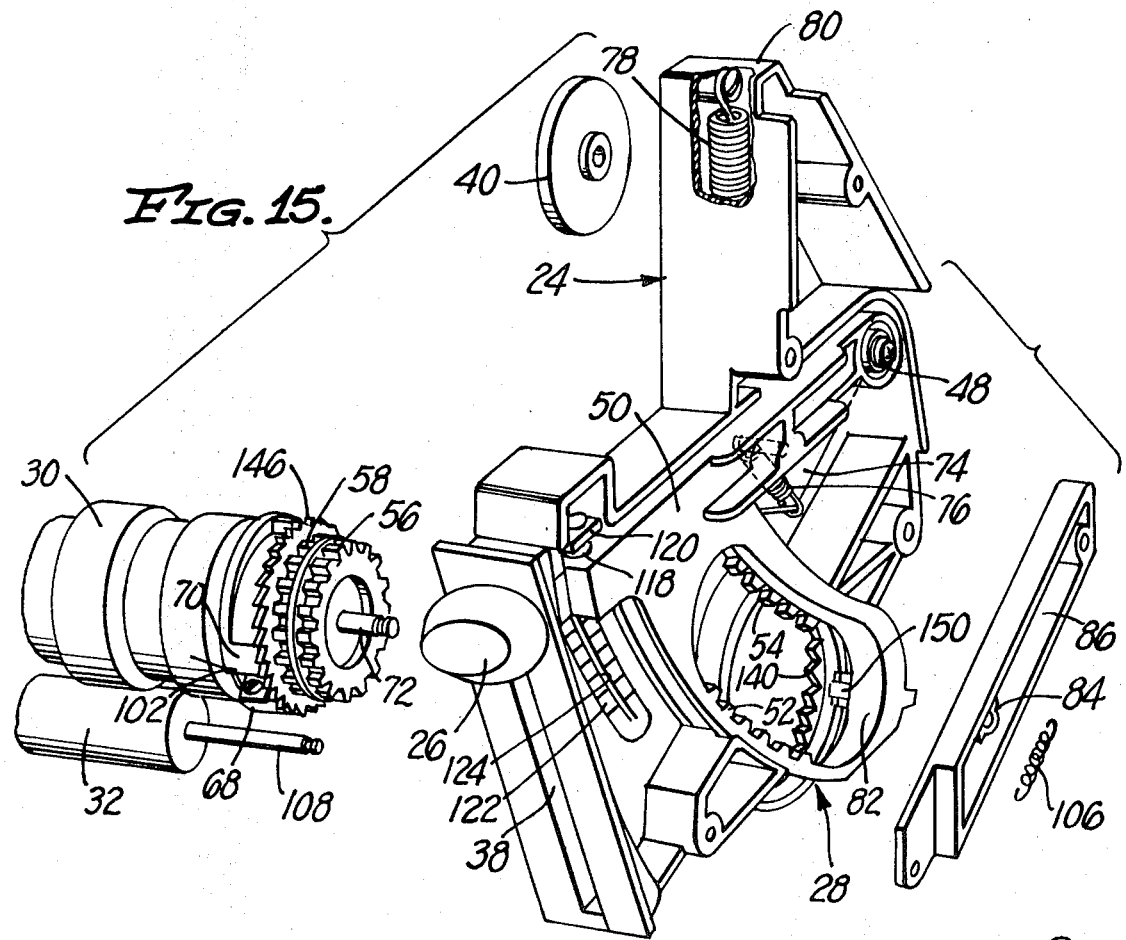
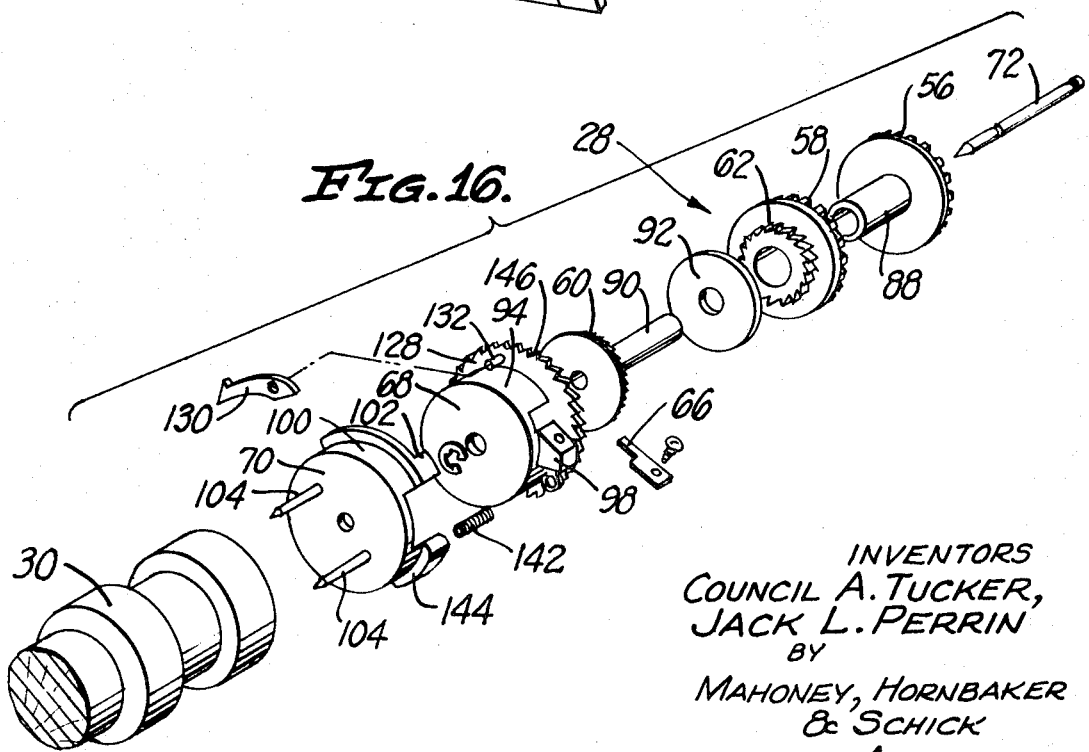
INVENTORS
COUNCIL A. TUCKER,
JACK L. PERRIN
BY
MAHONEY, HORNBAKER
& SCHICK
ATTORNEYS

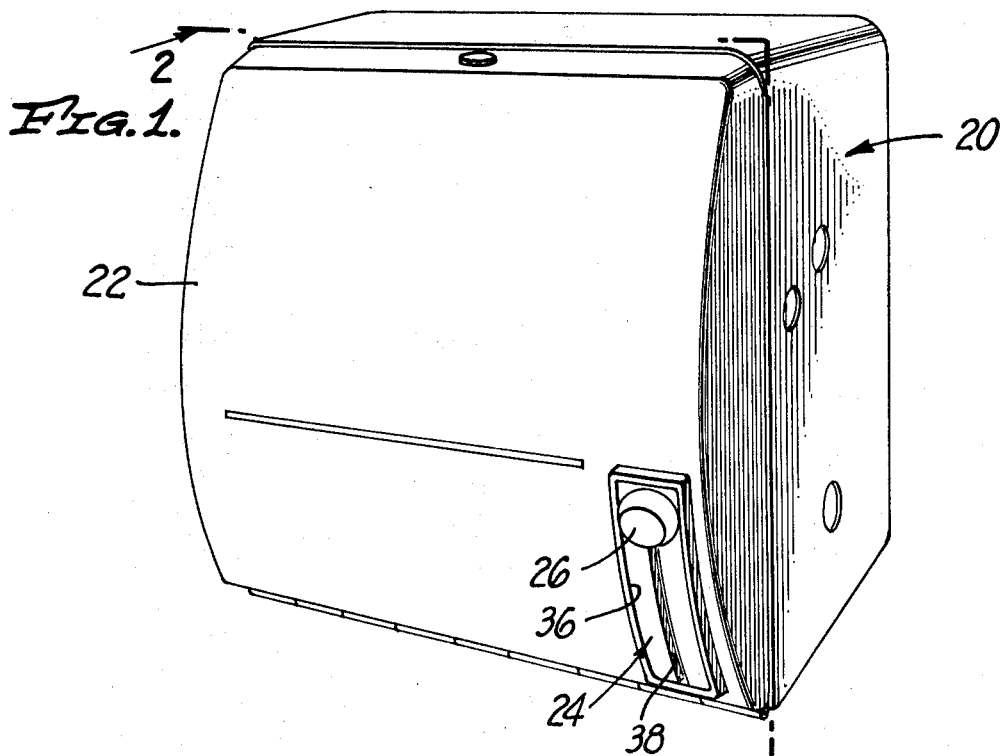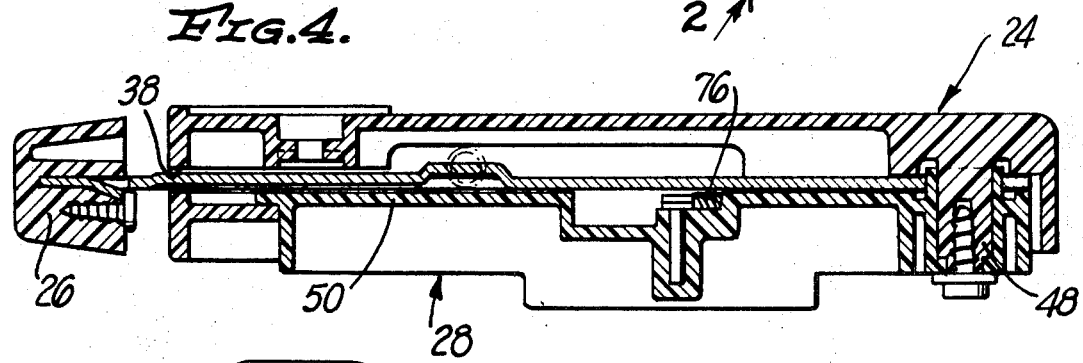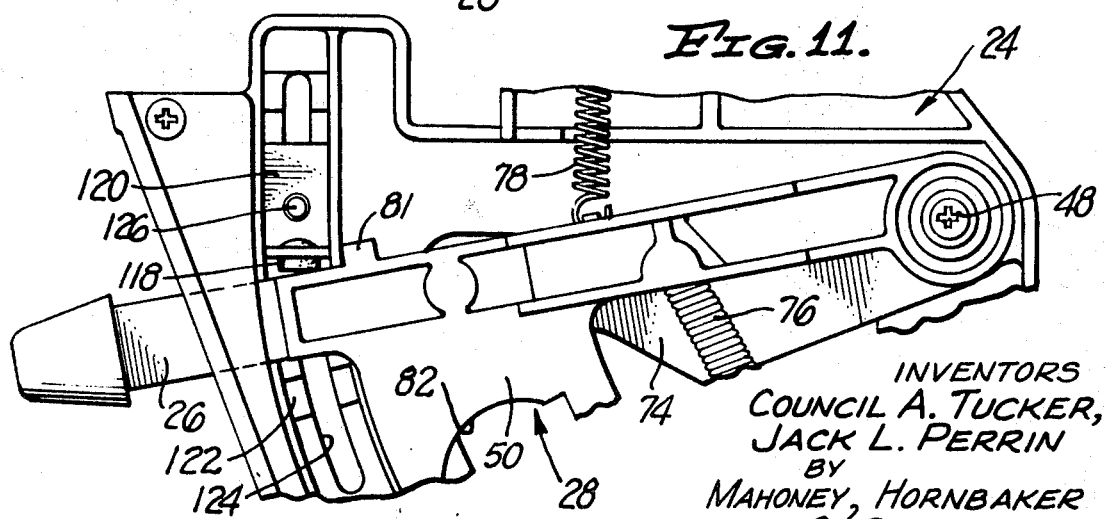

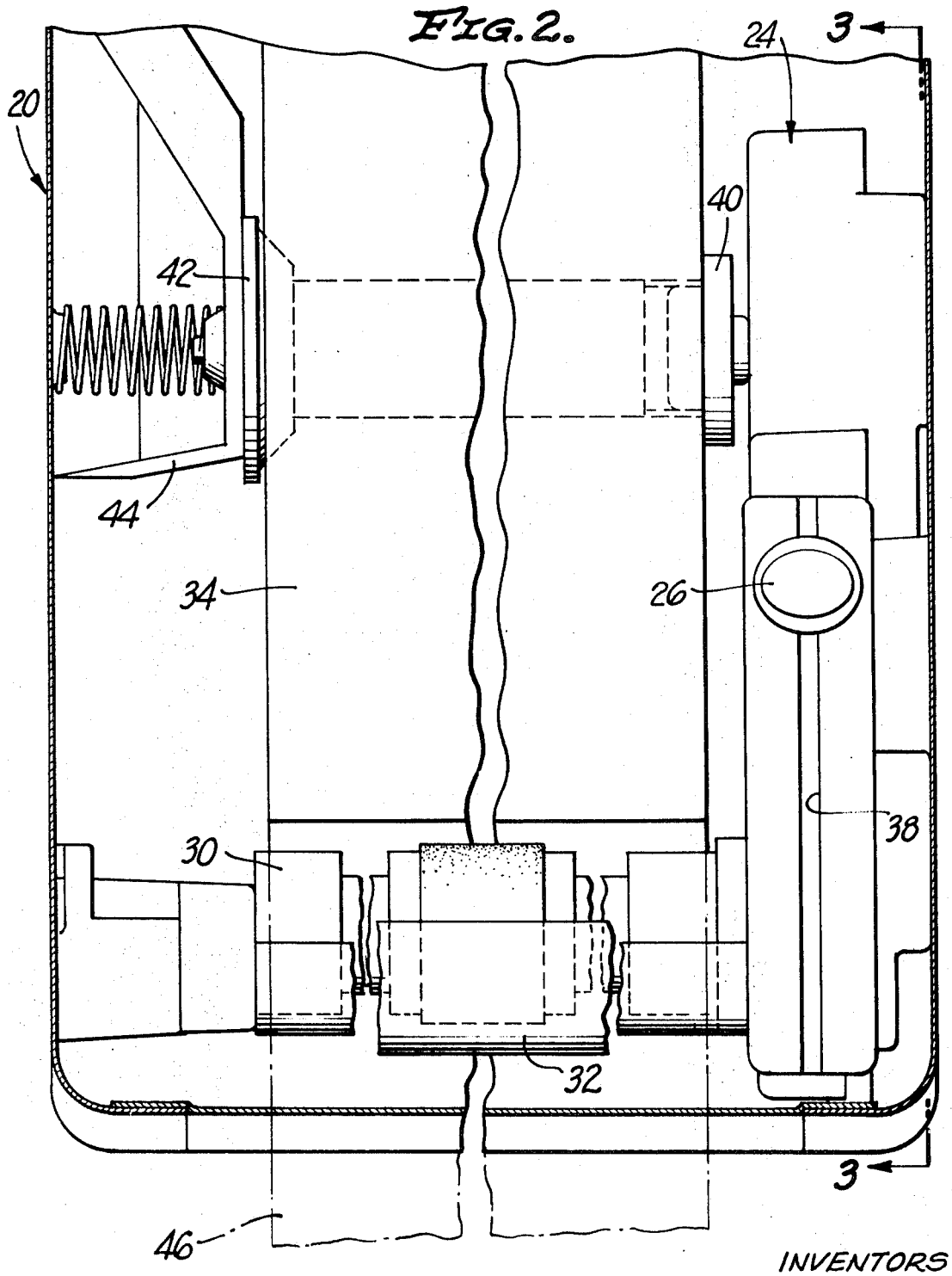

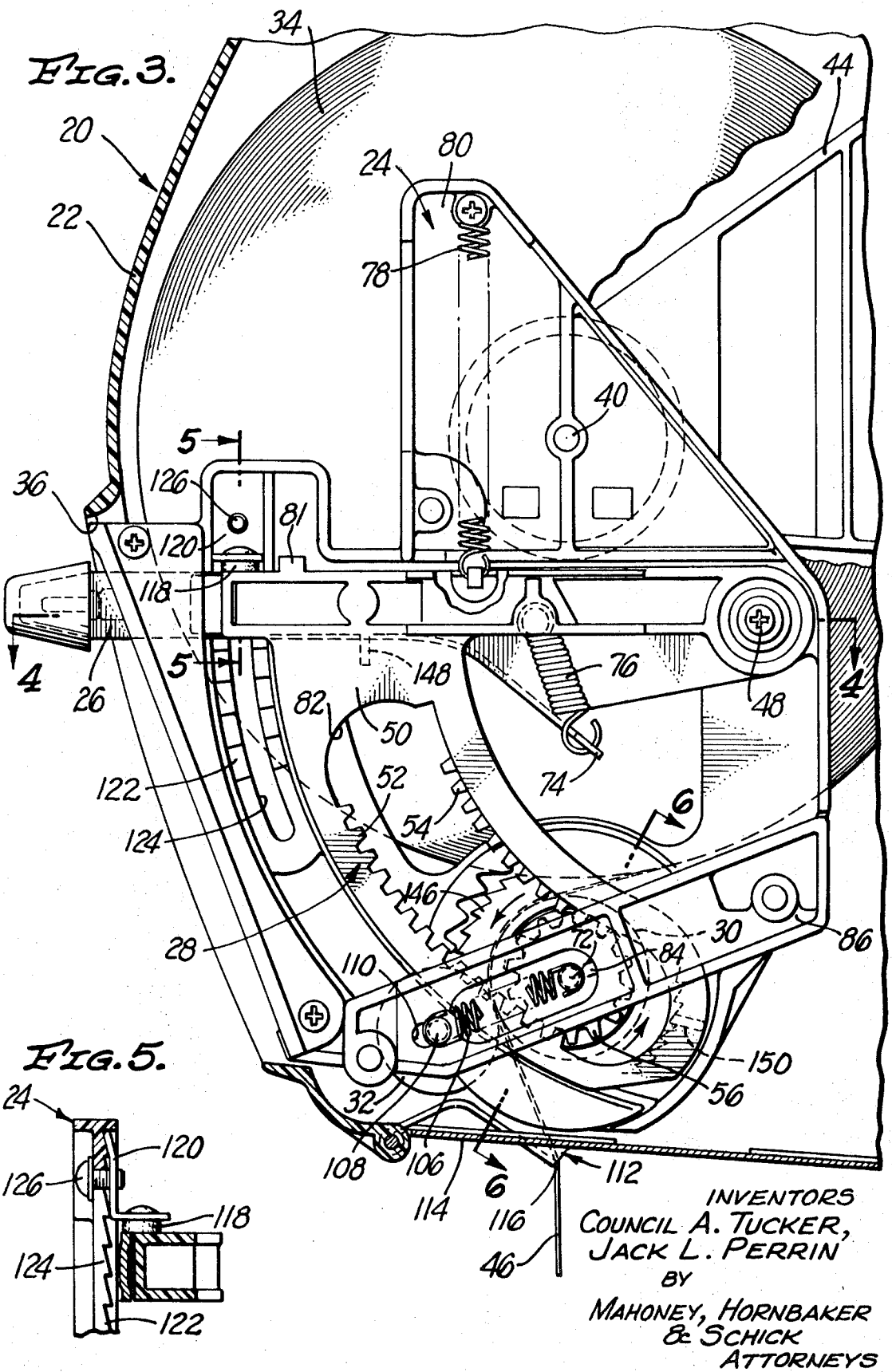

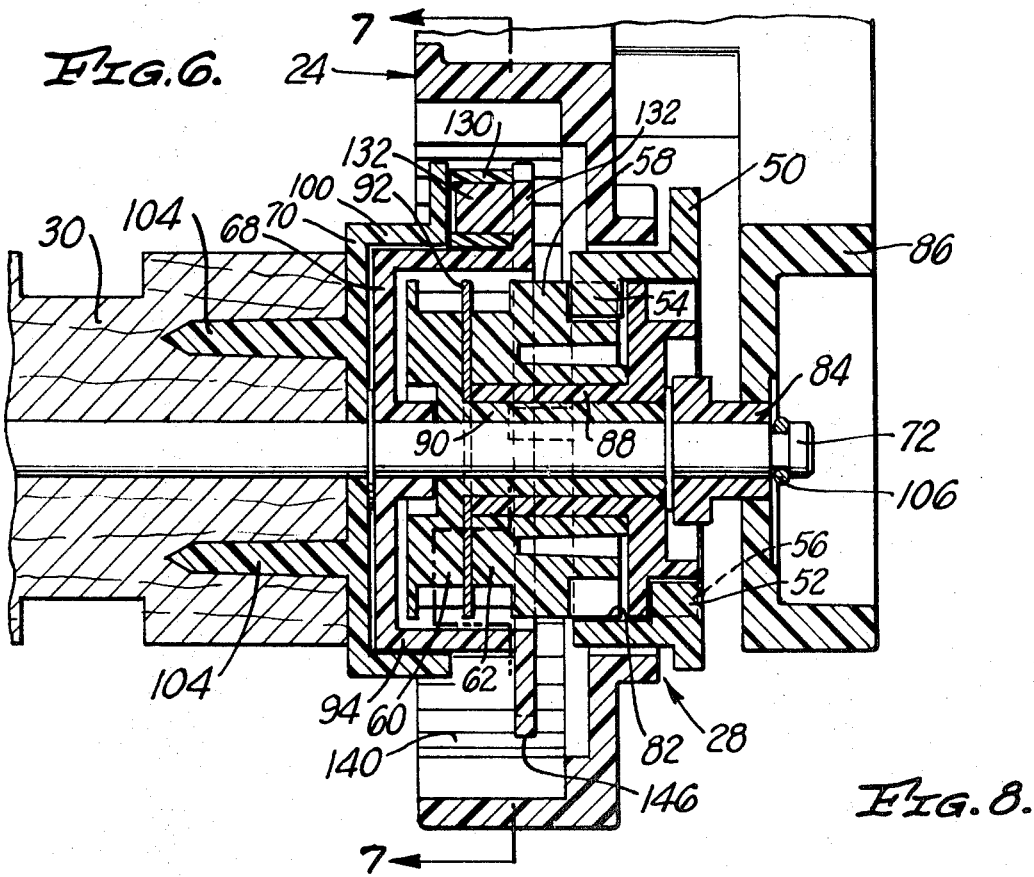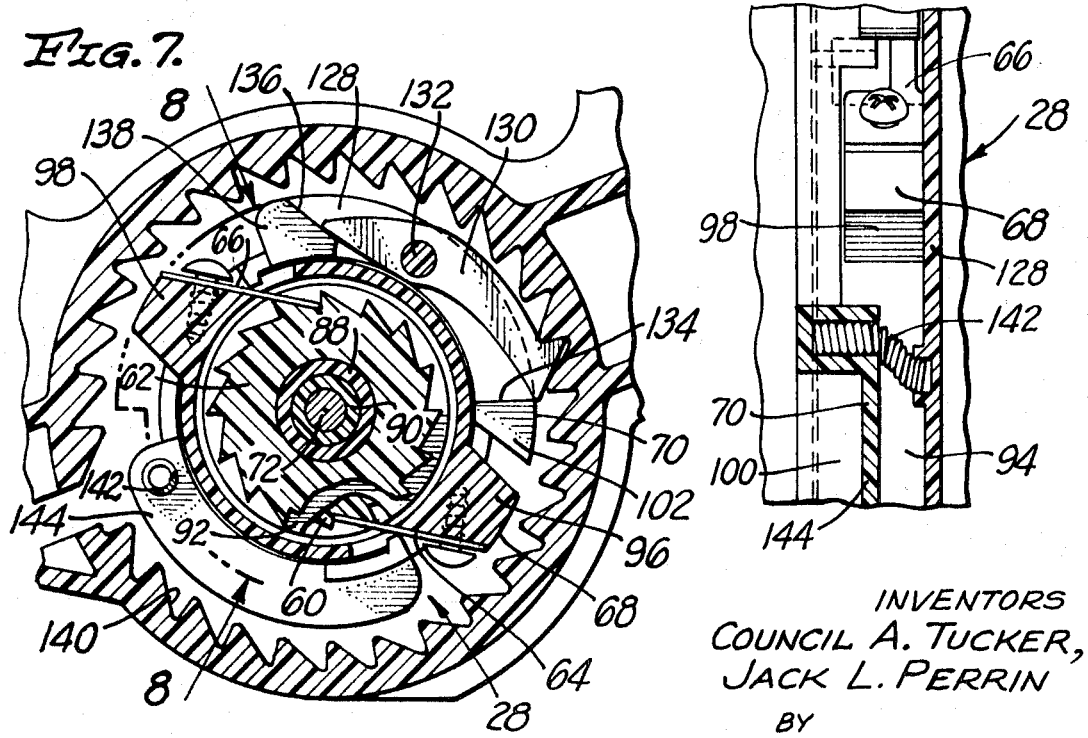

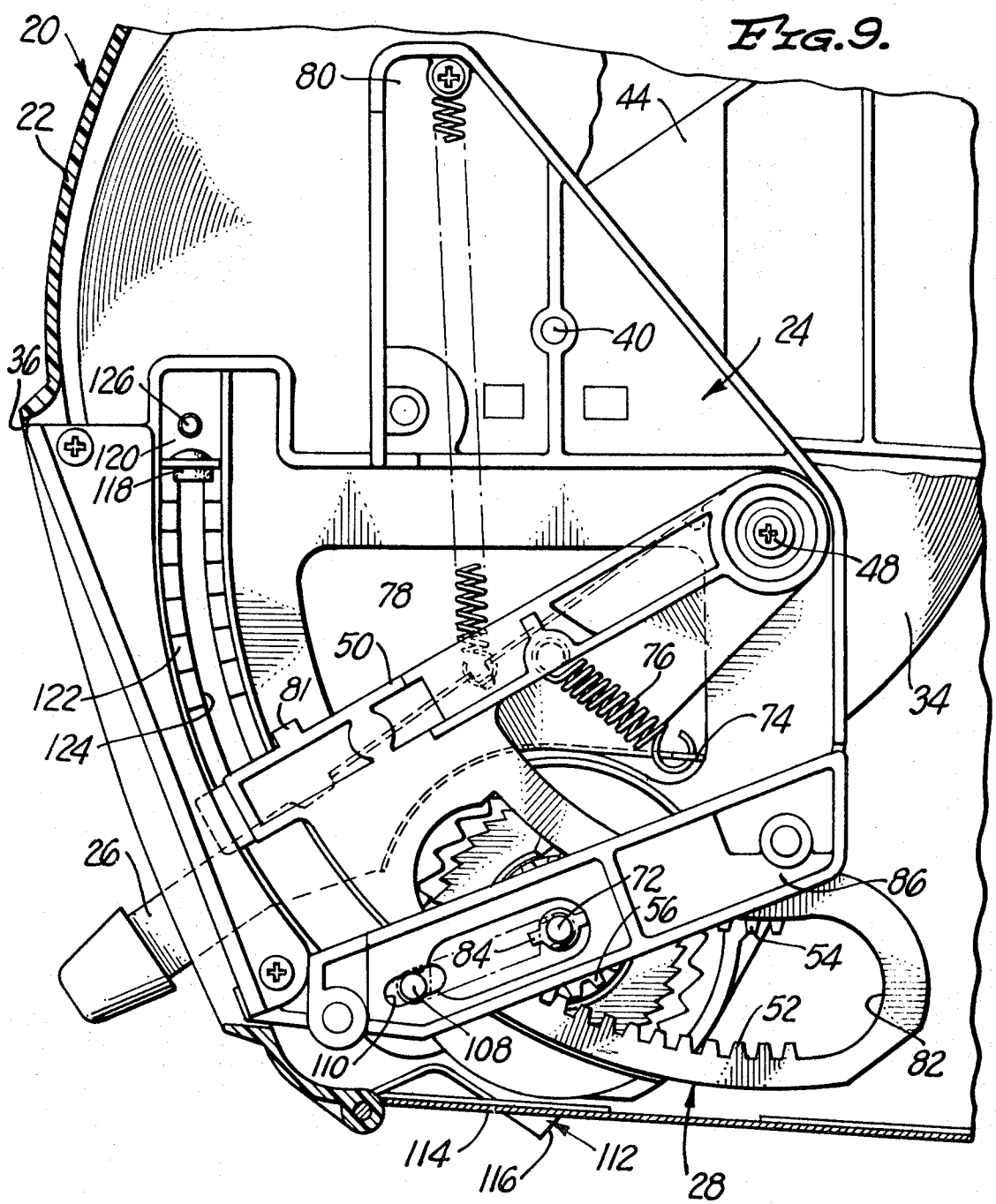

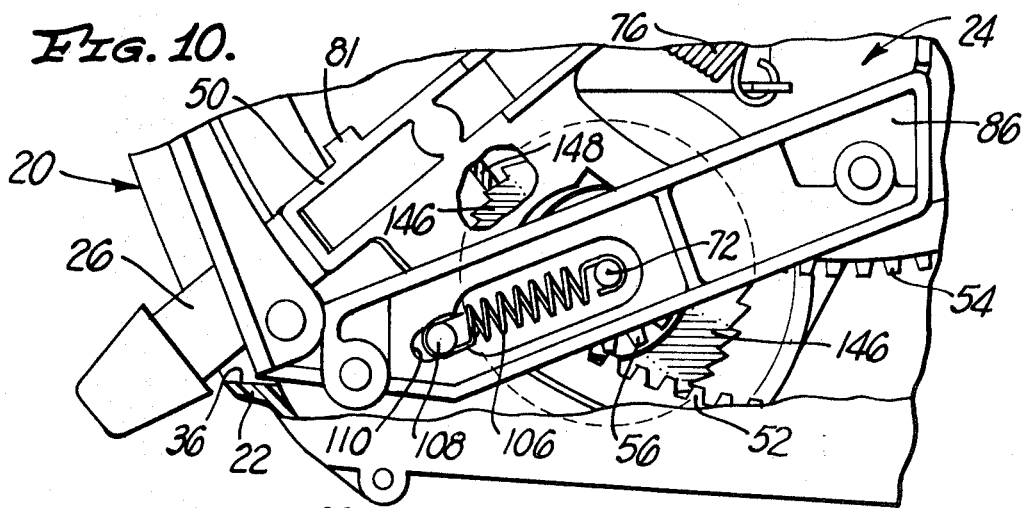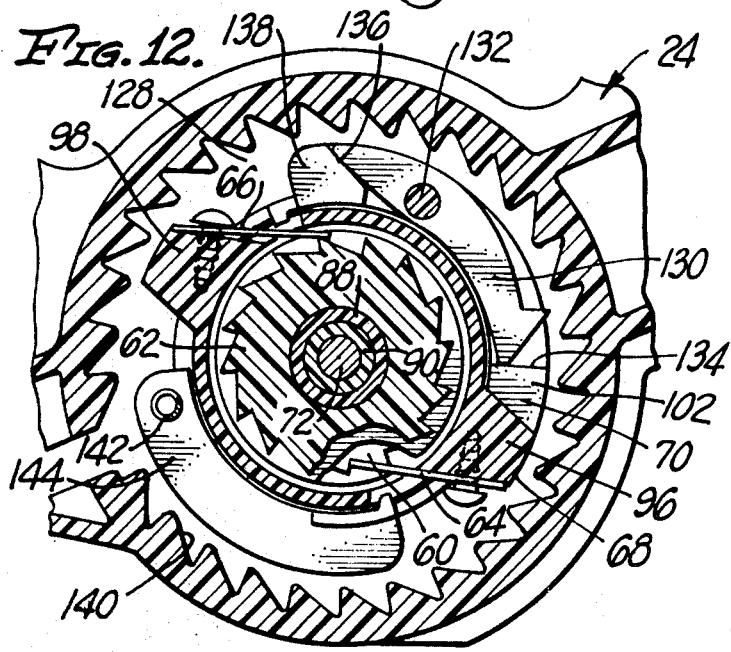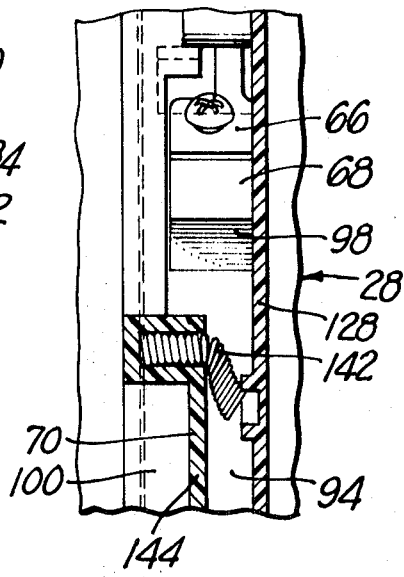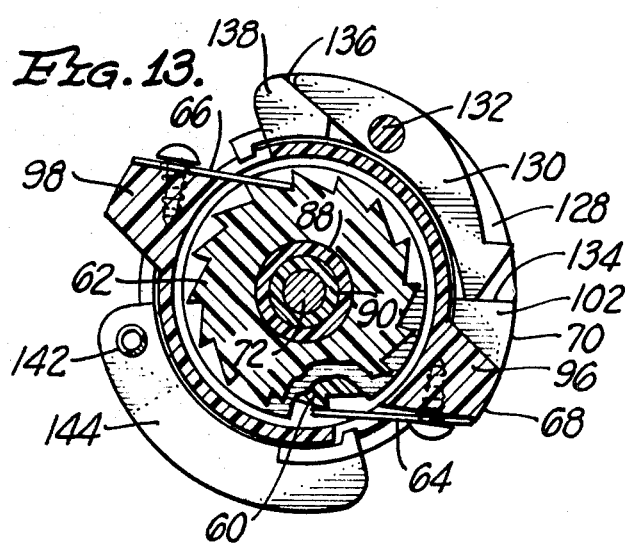

United States Patent Office 3,606,125
Patented Sept. 20, 1971

3,606,125
LEVER ACTUATED ROLL TOWEL DISPENSER
Council A. Tucker, Glendale, and Jack L. Perrin, Los Angeles, Calif., assignors to Towlsaver, Inc., Los Angeles, Calif.
Filed Aug. 26, 1969, Ser. No. 853,226
Int. Cl. B65h 17/26
U.S. Cl. 226—130
44 Claims

ABSTRACT OF THE DISCLOSURE

A reciprocal operating lever drives a rotatable member, preferably the dispensing roll of a roll towel dispenser, in a single direction of rotation during both forward and return strokes of said lever drawing a toweling continuous web from a supply roll and dispensing lengths thereof from between said dispensing roll and a pressure roll during said lever strokes. The operating lever drives the dispensing roll through ratchet controlled rack-gear assemblies alternately actionable during the lever strokes for the dispensing roll single direction rotation. A pivotal hook anti-milking means locks the dispensing roll in the event a force is applied to the toweling web being dispensed attempting to overrun the dispensing roll rotation and also when the dispensing roll is stationary. Anti-overspin means locks the dispensing roll at the end of the lever strokes preventing momentum of the dispensing roll from causing roll overspin beyond the lever movements. Also, lever stroke adjustment may be provided for selectively adjusting the lever stroke as permitted by continued drive between the lever and dispensing roll despite lever reversal in either direction of movement.

BACKGROUUND OF THE INVENTION

This invention relates to a lever actuated rotatable device such as a lever actuated roll dispenser having a reciprocal operating lever uniquely connected for driving the rotatable member in a single direction of rotation during both first or forward and reverse return strokes upon reciprocation of the operating lever. More particularly, the driving connection between the operating lever and the rotatable member, for instance, the dispensing roll of a roll towel dispenser, is preferably such that reversal of movement of the operating lever at any point along its forward and return strokes will continue to transmit or transfer rotational motion to the dispensing roll in the single direction of rotation, it not being required to complete a definite length of lever movement before reversal of such movement takes place. Furthermore, this unique driving connection between the operating lever and the rotatable member or the dispensing roll by virtue of the lack of requirement of any definite operating member stroke length permits the provision of stroke adjustment means which is selectively adjustable for limiting the operating member stroke to virtually any length desired with such adjustment determining the total length of the web of material, such as toweling, dispensed by the dispensing roll in a single operating lever reciprocation.

In addition to the foregoing, and particularly where the unique operating lever and rotatable member combination is incorporated in a roll towel dispenser, anti-milking means may be arranged for preventing overrunning of the dispensing roll ahead of the normal rotatable motion transfer from the operating lever during reciprocal movement of the operating lever as could be caused by a force being applied to the toweling web being dispensed attempting to force the dispensing roll rotatably ahead of such normal motion transfer. At the same time, this anti-milking means may be arranged to likewise prevent dispensing roll rotation between the operating lever movements, whether intermediate an operating lever reciprocal stroke or between such strokes so that the anti-milking means effectively frustrates any attempt by a person operating the dispenser grasping the toweling web portion being or just dispensed and attempting to indiscriminately pull lengths of the toweling web from the dispenser. Still further, anti-overspin means may be provided effective at least between the operating lever forward and return strokes locking the rotatable member or dispensing roll against overspin caused by the momentum thereof at the end of motion transfer upon completion of the operating lever forward stroke.

Most prior roll towel dispensers adapted for dispensing continuous lengths of a toweling web from a supply roll of such toweling web may be segregated into two fundamental types of construction. One of such prior types is that in which the dispensing or delivery of the length of toweling web is accomplished by grasping a projecting end of such toweling web and manually pulling the toweling web from the dispenser, with the dispenser having a metering mechanism for determining the overall length of toweling web dispensed during one manual urging. The other type of such prior dispensers is that in which some form of dispenser operating lever, usually rotatable or linearly movable, must be actuated by the person operating the dispenser and a determined movement of the operating lever will dispense a metered length of the toweling web.

Keeping in mind the usual impatience of persons in operating relatively simple mechanical mechanisms to accomplish simple tasks, particularly as occasioned by the imagined or real shortage of time for persons in our modern society, and also the fact that when the usual paper toweling web is desired from a dispenser, the person operating the same must usually do so with wet hands, the first of the two fundamental types of dispenser construction wherein the paper toweling web is manually pulled from the dispenser by direct grasping of the same is the least desirable. In the first instance, the proper pulling of the paper toweling web from the dispenser by manually grasping the same is directly dependent on the wet strength of the paper forming the toweling web so that the absorbency and softness of the paper toweling web must necessarily be restricted in order to prevent premature tearing thereof during the dispensing. Secondly, and related to the foregoing problem, the paper toweling web is subject to accidental tearing off internally of the normal dispenser tearoff means in view of the force necessarily being applied thereto and unless some form of emergency secondary ejecting means for the toweling is provided, the dispenser will remain inoperable for performing its dispensing function until maintenance adjustments are made. On the other hand, one definite advantage of this first type of construction is the fact that these dispensers may be either surface or recess wall mounted in washrooms and the like since they do not depend on any access to particularly positioned operating levers, but the stated disadvantages thereof have made their use extremely limited.

In the second of the two fundamental types of dispenser construction, the dispensers provide a positive toweling web delivery which, for the main part, is dependent only on a positive actuation of an operating lever of one form or another and from the dispensing standpoint, the toweling web physical properties are not of importance, eliminating any restriction thereon as to absorbency and softness. In this latter form of dispenser construction, the main axes of the toweling web supply and dispensing rolls will normally necessarily project parallel to a wall surface upon which the dispensers are mounted and where the rotatable type of operating handle is used, mounting of the rotatable operating handle at the front surface of the dispenser cabinet results in necessarily complicated right-angle drive mechanisms which further necessarily restrict the rate of delivery of the toweling web, all as involved for practical and economical dispensers. Side mounting of the rotatable operating levers does, to an extent, eliminate the immediately foregoing problems, but, in turn, greatly restricts the mounting of the dispensers and will not permit full recessing of the same in a wall surface due to the side rotatable operating lever accessibility requirement.

Probably the least problems are encountered by use of this second fundamental type of dispenser construction operated by a reciprocal operating lever projecting forwardly so as to be accessible at the front surface of the dispenser cabinet, thereby permitting the free choice of wall surface or recessed mounting of the dispensers. With the reciprocal operating lever, some form of rack and gear is provided, the rack being mounted movable with the reciprocal operating lever and the gear being mounted on a fixed center relative to the dispensing roll, such arrangement being practical in view of the coplanar relationship of the elements and the simplicity of such connection. During operation, the dispensing roll is rotated in a dispensing direction by downward movement of the operating lever and a single direction clutch must be provided between the drive gear and the dispensing roll disconnecting rotatable drive therebetween during the operating lever upward return stroke in order to prevent the toweling web dispensed on the operating lever down stroke from being drawn back up into the dispenser during the operating lever return stroke.

With these reciprocal lever operated dispensers, a major problem is encountered occasioned by the fact that the length of toweling web dispensed by a single downward lever dispensing stroke is dependent proportionately on the linear length of such lever stroke. Using a normal diameter dispensing roll and lever operated drive gear, a downward lever stroke is required that covers a large part of the vertical height of the dispenser cabinet. This is not only awkward in manipulation by the person operating the dispenser, but also creates structural and design problems.

Within the limitations of these prior reciprocal lever operated dispensers, the immediately suggsted answer for solving the foregoing problems is to shorten the operating lever downward dispensing stroke by use of a larger diameter dispensing roll and a smaller diameter drive gear. If this is done, however, the lever pressure on the operating lever required for rotating the dispensing roll is substantially increased and becoms prohibitive. Furthermore, adding to the size of the dispensing roll readily increases the expense of the particular dispenser and is also quite space-consuming, both of which are objectionable if an economical dispenser is to be provided which may be mounted within a reasonable wall space.

OBJECTS AND SUMMARY OF THE INVENTION

It is, therefore, an object of this invention to provide a reciprocal lever actuated rotatable member, preferably a lever actuated roll towel dispenser, wherein the rotatable member or dispensing roll is rotated in a single direction in both linear directions of movement of the reciprocal operating lever, thereby, in the case of the roll towel dispenser, dispensing a toweling web in a single direction during the first or forward and reverse return linear movements of the operating lever. For accomplishing the foreging results, a unique motion transfer means is provided between the reciprocal operating lever and the rotatable member or dispensing roll transferring the operating lever linear movements in the forward and return directions into a single direction of rotation of the rotatable member or dispensing roll. According to the present invention, the unique motion transfer means is preferably two racks connected movable with the operating lever respectively engaging gears rotatable on fixed centers relative to the rotatable member or dispensing roll and ratchet connected to said rotatable member or dispensing roll, one gear driving and the other gear rotating idle during the operating lever forward stroke and the other gear driving and one gear rotating idle on the operating lever reverse return stroke, the gear driving always being in the same single direction of rotation.

It is a further object of this invention to provide a reciprocal lever actuated rotatable member, such as a lever actuated roll towel dispenser, having the foregoing double drive feature wherein the actuating lever may be reversed between its forward and return strokes at any point intermediate the maximum total lengths of said strokes while still rotating the rotatable member or dispensing roll in the single direction of rotation, the only result being a shortening of said strokes and less total single direction rotation of the rotatable member or dispensing roll. The unique motion transfer means between the operating lever and the rotatable member or dispensing roll is arranged for automatic transfer or switchover, due to the gear ratchet connections to the rotatable member or dispensing roll, between the two gear drives regardless of when the operating lever is reversed between its forward and return paths of movement. Thus, if the operating lever is moved in its forward stroke only a part of the maximum overall length of said stroke and then reversed to move in the return stroke back to the starting position, the rotatable member or dispensing roll will still be rotated in the single direction of rotation during both operating lever strokes but for a lesser period of time, the transfer of drive between the gears for the single direction rotation being completely automatic and impossible to frustrate.

It is still an additional object of this invention to provide a reciprocal lever actuated rotatable member such as a lever actuated roll towel dispenser of the foregoing general type which may include selective stroke adjustment means for the operating lever having the effect of merely changing the maximum overall lengths of the operating lever forward and return strokes and having no effect on the single direction rotation of the rotatable member or dispensing roll during such operating lever strokes. Again, as permitted by the unique motion transfer means between the operating lever and the rotatable member or dispensing roll, it is merely necessary to provide an adjustable stop at either common end of the operating lever forward and return strokes and the selective adjustment thereof will merely shorten or lengthen the maximum total lengths of said strokes while the rotatable member or dispensing roll is still rotated in the single direction throughout the shortened or lengthened strokes. In this manner, by selective adjustment of the stroke adjustment means, it is possible, for instance, in a roll towel dispenser, to selectively adjust or preset the maximum total length of toweling web that can be dispensed upon one reciprocal movement of the operating lever and such dispensed length can be changed at any time by selective adjustment as desired.

It is also an object of this invention to provide a reciprocal lever actuated rotatable member, such as a lever actuated roll towel dispenser, wherein the length of toweling web that may be dispensed therefrom is controlled solely by the rotatable member or dispensing roll and it is impossible to milk lengths of the toweling web from the dispenser ahead of or overrunning the dispensing roll rotation during such rotation or while such roll is stationary. In the use of roll towed dispenser, it is common for persons operating the same to grasp the end of toweling web being dispensed during such dispensing and attempt to pull the toweling web from the dispenser ahead of the dispensing roll in an effort to increase the speed of such dispensing or gain an increased length of toweling web during a single dispenser actuation. Also, it is sometimes attempted to directly pull the lengths of toweling web from the dispenser after partial or normal full actuation thereof with the same goal in mind of an increased length of toweling web.

According to the present invention, a unique antimilking means may be incorporated in the dispenser or other device to which the mechanism is adapted which effectively locks the rotatable member or dispenser roll at least during such milking attempts, the anti-milking means being actionable at any time such attempts are made to pull the toweling web ahead of the dispensing roll rotation, whether the dispensing roll is then rotating in its single direction during the dispensing operation or whether the dispensing roll is stationary between such dispensing operations. This anti-milking means is preferably in the form of a pivotal hook operably arranged preferably within a unique rotatable connection between the motion transfer means and the dispensing roll being rotated, said pivotal hook being adapted for remaining inactive at least during normal motion transfer and dispensing roll rotation, but being automatically actionable during attempted overrunning or milking of the dispensing roll to lock the dispensing roll and frustrate such overrunning or milking during both normal dispensing roll rotation or between such rotations. For maximum anti-milking deterrence and with the unique mechanism incorporated, the antimilking means may be arranged for being active to lock the dispensing roll at all times against such attempted milking except when the dispensing roll is being rotated in the normal dispensing manner by the motion transfer means and as a result of normal actuation of the reciprocal operating lever.

It is still another object of this invention to provide a reciprocal lever actuated rotatable member, such as a lever actuated roll towel dispenser which may have incorporated therein anti-overspin means preventing the rotatable member or dispensing roll from overspinning the normal motion transfer thereto caused by the momentum of the rotatable member or dispensing roll at least at the end of the actuating lever forward stroke and during reversal of such lever for commencing the return stroke. For instance, assume that a person operating the dispenser applies an excessive force to the reciprocal operating lever during the forward lever stroke, this anti-overspin means automatically engages at the end of the forward stroke motion transfer upon the operating lever being moved its maximum forward stroke to lock the dispensing roll preventing further rotation and overspin until the operating lever has reversed. The anti-overspin means may also be provided for actuation at the end of the actuating lever return stroke resulting in the same locking and overspin prevention, all according to the principles of the present invention.

Other objects and advantages of the invention will be apparent from the following specification and the accompanying drawings which are for the purpose of illustration only.

BRIEF DESCRIPTION OF THE DRAWINGS

FIG. 1 is a perspective view showing an embodiment of lever actuated roll towel dispenser incorporating the principles of the present invention;

FIG. 2 is an enlarged, fragmentary, vertical sectional view of the dispenser of FIG. 1 looking in the direction of the arrows 2—2 in FIG. 1;

FIG. 3 is a fragmentary, vertical sectional view looking in the direction of the arrows 3—3 in FIG. 2;

FIG. 4 is a fragmentary, horizontal sectional view looking in the direction of the arrows 4—4 in FIG. 3;

FIG. 5 is an enlarged, fragmentary, vertical sectional view looking in the direction of the arrows 5—5 in FIG. 3;

FIG. 6 is an enlarged, fragmentary sectional view looking in the direction of the arrows 6—6 in FIG. 3;

FIG. 7 is a reduced, fragmentary vertical sectional view looking in the direction of the arrows 7—7 in FIG. 6 illustrating a part of motion transfer means of the dispenser in the stationary position free of transferring motion therethrough to a dispensing roll of the dispenser;

FIG. 8 is a fragmentary, sectional view looking in the direction of the arrows 8—8 in FIG. 7;

FIG. 9 is a view similar to FIG. 3, but showing a reciprocal operating lever of the dispenser in an intermediate position during its forward stroke;

FIG. 10 is a fragmentary view similar to FIGS. 3 and 9, but showing the reciprocal actuating lever at the end of its maximum forward stroke and ready for reversal to move in its reverse return stroke;

FIG. 11 is a fragmentary view similar to FIG. 3, but with the actuating lever retained in a starting position for selectively shortened forward and reverse return strokes by stroke adjustment means of the present invention;

FIG. 12 is a view similar to FIG. 8, but with the motion transfer means in a dispensing roll driving position during the operating lever forward stroke;

FIG. 13 is a view similar to FIG. 12, but with the motion transfer means in a dispensing roll driving position during the operating lever reverse return stroke;

FIG. 14 is a view similar to FIG. 8, but with the motion transfer means in the dispensing roll driving position in either of the operating lever forward or reverse return strokes;

FIG. 15 is a fragmentary, exploded, perspective view showing a portion of the dispenser frame, the operating lever, the motion transfer means, a portion of the dispensing roll and a portion of the pressure roll of the dispenser of FIG. 1; and FIG. 16 is a fragmentary, exploded, perspective view showing a portion of the motion transfer means and a portion of the dispensing roll of the dispenser of FIG. 1.

DESCRIPTION OF THE BEST EMBODIMENT CONTEMPLATED

Initially referring to FIGS. 1 through 4, an embodiment of lever actuated roll towel dispenser incorporating the principles of the present invention is shown housed in a hollow dispenser cabinet generally indicated at 20 having a hinge front access wall 22 and being adapted for wall surface or recessed mounting in the usual manner. More particularly, the cabinet 20 contains a mounting frame generally indicated at 24 supporting a reciprocal operating lever 26, motion transfer means generally indicated at 28, a dispensing roll 30, a pressure roll 32 and a supply roll 34. A portion of the dispenser including the cabinet access wall 22 and certain of the interior parts are preferably formed of one of the well known high impact, long wearing plastics, with the remainder of the parts including the major part of the cabinet 20 being formed of usual metals where required and appropriate.

In the positioning of the various elements within the cabinet 20, the reciprocal operating lever 26 and the motion transfer means 28 are mounted by the mounting frame 24 at the right hand portion of the cabinet with the dispensing, pressure and supply rolls, 30, 32 and 34 extending transversely across the cabinet. Furthermore, a forward part of the mounting frame 24 and the reciprocal operating lever 26 project forwardly through a vertically elongated opening 36 in the cabinet front wall 22 when said front wall is closed as shown in FIG. 1, so that the reciprocal operating lever is accessible for actuation from the front of the cabinet and is reciprocally movable downwardly in a first or forward stroke and upwardly in a reverse return stroke within a generally vertical slot 38 of the mounting frame. Within the cabinet 20, the dispensing roll 30 is rotatably mounted operably connected to the reciprocal operating lever 26 through the motion transfer means 28 as will be hereinafter described in detail, the dispensing roll being located at a lower portion of the cabinet extending transversely there-across and having the pressure roll 32 rotatably mounted resiliently urged radially thereagainst.

The supply roll 34 is removably and rotatably mounted approximately midway of the height and depth of the cabinet 20, for purposes of the present invention, being of any usual form and having a continuous web of material desired to be dispensed, preferably a continuous web of paper toweling wound thereon for clockwise rotational removal therefrom as viewed from the right hand side of the cabinet. A right hand end adapted 40 of the supply roll 34 is rotatably mounted though the mounting frame 24 and a left hand end adapted 42 is rotatably mounted on a transversely spring urged bracket 44, the adapters axially engaging the core portion of the supply roll and being slightly frictionally rotatable restricted so as to require pulling of a toweling web free end portion 46 for rotation of the supply roll and the removal of the toweling web therefrom. In view of the transverse spring urged mounting of the bracket 44, this bracket and the left hand end adapter 42 of the supply roll 34 may be transversely withdrawn from the core portion of the supply roll in order to remove and replace the supply roll upon the toweling web thereon being exhausted during dispensing.

As best seen in FIGS. 3, 4, 9, 10 and 15, the operating lever 26 extends rearwardly through the slot 38 of the mounting frame 24 at the cabinet front wall 22 and is rearwardly pivotally engaged over a pivot shaft 48 at a rearward part of the mounting frame. Thus, through the pivotal connection to the mounting frame 24, the operating lever 26 is mounted reciprocal along the mounting frame slot 38 downwardly from a starting position as shown in FIGS. 3 and 15 along its first or forward stroke and preferably throughout a determined maximum length thereof, and then upwardly along its reverse return stroke back to its starting position. Furthermore, this linear pivotal motion of the reciprocal operating lever 26 in both its forward and reverse return strokes is converted or transferred into single direction rotation of the dispensing roll 30, that is, the same single direction of the dispensing roll despite the reversal of linear directional movement of the operating lever, by the motion transfer means 28.

Referring initially to FIGS. 3, 4, 9, 10, 15 and 16, the motion transfer means 28 includes a rack quadrant 50 having first and second somewhat arcuate racks 52 and 54, first and second drive gears 56 and 58, first and second ratchet wheels 60 and 62, first and second ratchet fingers 64 and 66, a ratchet cap 68 and a drive cap 70. The rack quadrant 50, as particularly shown in FIG. 4, is separately pivotal but mounted on the same pivot shaft 48 as the reciprocal operating lever 26, being transversely adjacent and at the right hand side of the operating lever, so as to be pivotally movable in the same generally arcuate sphere of movement as the operating lever. On the other hand, all of the racks, gears, ratchet wheels, ratchet fingers, ratchet cap and drive cap, 52 through 70, are mounted rotatable or movable about the same fixed center which is the center of rotation of the dispensing roll 30, these elements being assembled in a particular axially stacked condition rotatably telescoping a reduced center pin 72 of the dispensing roll 30 which also rotatably mounts the right hand end of the dispensing roll.

Returning to the relationship between the reciprocal operating lever 26 and the rack quadrant 50 which are independently pivotal on the mounting frame pivot shaft 48 but transversely adjacent, the operating lever has a downwardly projecting portion 74 which is resiliently connected through a helical tension spring 76 extending angularly upwardly and connected to the rack quadrant 50. At the same time, the operating lever 26 is resiliently connected by an upwardly extending, helical tension spring 78 to an overlying portion 80 of the mounting frame 24, this latter tension spring 78 being for the purpose of returning the operating lever 26 when it is moved downwardly tensioning such spring. Thus, although both the reciprocal operating lever 26 and the rack quadrant 50 start from a common starting point, during the initial downward forward movement of the operating lever, this operating lever will move ahead of the rack quadrant as permitted by the tension spring 76 connected therebetween and as illustrated in FIG. 9 with the rack quadrant ultimately catching up and finishing the downward forward stroke of the operating lever with said operating lever through urging of tension spring 76 and as illustrated in FIG. 10, the operating lever and rack quadrant moving upwardly together during and to the finish at the original starting point in the operating lever reverse return stroke as urged by the lever return tension spring 78 and the rack quadrant engagement tab 81 overlying the operating lever as shown in FIGS. 3, 9, 10 and 11.

Although the basic function of the generally simultaneous pivotal movement of the operating lever 26 and the rack quadrant 50 would be equally as well, if not better served by a solid securement between the operating lever and rack quadrant for accomplishing the motion transfer and the toweling web dispensing, the purpose of this lagging motion spring connection is, among others, to eliminate the shock that would otherwise be transferred to the operator by the operating lever if the initial downward movement of the operating lever immediately commenced rotation through the motion transfer means 28 of the dispensing roll 30. This is particularly true in view of the fact that there is frequently an excess or overrun of the toweling web free end portion 46 from the supply roll 34 which has not yet been dispensed by the dispensing roll 30 at the end of a dispensing operation so that the initial movement of the dispensing roll 30 at the commencement of a dispensing operation and during the initial movement downwardly of the operating lever 26 has only slight resistance taking up this toweling web excess, followed by a heavy resistance when the dispensing roll is required to actually draw the toweling web free end portion directly from the supply roll. The tension spring 76 permits the cushioning of the change in resistance of the dispensing roll 30 as ultimately transferred to the operating lever 26, while the tension spring 78 permits the rack quadrant 50 to gradually catch up to the operating lever and move therewith during the latter stages of the dispensing operation. Furthermore, the resilient tension spring 76 connection between the operating lever 26 and the rack quadrant 50 obviates any possibility of causing damage to any of the rack quadrant and other parts of the motion transfer means 28 when the motion transfer means and dispensing roll 30 are jammed deliberately by hand or otherwise, by forcing the operating lever downwardly when the motion transfer means cannot move.

The rack quadrant 50 has formed transversely therethrough an elongated somewhat arcuate opening 82 with the first rack 52 being formed along the generally lower forward edge of this opening and the second rack 54 being formed along the generally rearward upper edge of this opening. Both the first and second racks 52 and 54 project operably into this opening 82, but the racks are transversely spaced on the rack quadrant 50, one from the other determined distance. In the particular arrangement of the motion transfer means 28, the first rack 52 is spaced transversely to the right from the second rack 54, as best seen in FIGS. 6 and 15.

The previously mentioned center pin 72 of the dispensing roll 30 projects axially from the right hand end of the dispensing roll and through the rack quadrant opening 82 at a point midway between the rack quadrant first and second racks 52 and 54, the end of the said roll center pin being engaged through a boss 82 of a mounting bar 86 on the mounting frame 24. As partially seen in FIGS. 3 and 9, and particularly shown in FIG. 6, the first drive gear 56 is telescoped over the dispensing roll center pin 72 radially aligned and engaged with the rack quadrant first rack 52 within the rack quadrant opening 82, said first drive gear actually having an elongated sleeve extension 88 telescoping a similar sleeve extension 90 of the first ratchet wheel 60 which is axially spaced to the left of the first drive gear. The sleeve extension 88 of the first drive gear 56 and the sleeve extension 90 of the first ratchet wheel 60 are secured together for common rotation and so as to rotate as a unit relative to the dispensing roll center pin 72.

The second drive gear 58 is rotatably telescoped over the sleeve extension 88 of the first drive gear 56 with said second drive gear being slightly axially spaced to the left of the first drive gear and radially aligned and engaged with the rack quadrant second rack 54. The second ratchet wheel 62 is secured directly to the left hand face of the second drive gear 58 so that the second drive gear and second ratchet wheel are likewise rotatable as a unit. As shown in FIG. 6, the first ratchet wheel 60 is positioned axially to the left of the second ratchet wheel 62 and these ratchet wheels are separated for independent rotation with their respective drive gears by a baffle washer 92.

The ratchet cap 68 is rotatably telescoped over the dispensing roll center pin 72 generally to the left of the first ratchet wheel 60 and has an annular, axially projecting collar 94 radially outwardly telescoping both the first and second ratchet wheels 60 and 62, as well as the baffle washer 92 therebetween. Diametrically opposed first and second driving abutments are formed on the ratchet cap collar 94 projecting generally radially outwardly therefrom and respectively mounting the angularly inwardly projecting first and second ratchet fingers 64 and 66 as shown, for instance, in FIGS. 7, 12, 13 and 15. The first ratchet finger 64 is radially aligned with the first ratchet wheel 60 projecting through an appropriate opening in the ratchet cap collar 94 into engagement with the first ratchet wheel, while the second ratchet finger 66 is similarly radially aligned with the second ratchet wheel 62 projecting inwardly through an appropriate opening in the ratchet cap collar and into engagement with the second ratchet wheel.

It will be noted that the formation of the first and second ratchet wheels 60 and 62 in their engagements with their respective first and second ratchet fingers 64 and 66 is such that rotation of the ratchet wheels in the counter clockwise direction as viewed from the right hand end of the dispensing roll center pin 72 will drive the respective ratchet fingers, and consequently the ratchet cap 68, in the counter clockwise direction, but rotation of the ratchet wheels in the clockwise direction will permit their respective ratchet fingers merely to loosely flop thereover without the transmission of drive. Although the total import of this arrangement will discussed hereinafter in detail, it is sufficient to consider for the moment that the ratchet wheels 60 and 62 can only drive the ratchet cap 68 in the counter clockwise direction as viewed from the right. When either of the ratchet wheels 60 or 62 is rotated in the clockwise direction, no drive will be transmitted therefrom to the ratchet cap 68, since the ratchet finger 64 or 66 of that particular ratchet wheel will merely loosely flop thereover, any danger of a ratchet finger crossing over and engaging the wrong ratchet wheel being eliminated by the previously described baffle washer 92 axially between the ratchet wheels and the inwardly projecting ratchet fingers. Furthermore, with the ratchet wheels 60 and 62 formed of a sound-deadening plastic, and even with the ratchet fingers 64 and 66 formed of a spring metal, such flopping of the ratchet fingers over their respective ratchet wheels will be virtually noiseless.

The drive cap 70 is rotatably telescoped over the dispensing roll center pin 72 to the left of the ratchet cap 68 and has an axially extending collar 100 partially axially telescoping the ratchet cap as shown in FIG. 6. Although both the ratchet cap 68 and the drive cap 70 have additional specific structure which will be hereinafter described with the purpose thereof explained, for present purposes it may be noted that the ratchet cap and drive cap are relatively rotatable on the dispensing roll center pin 72 a determined amount in the order of 8 degrees and the drive cap collar 100 has appropriate cut-outs permitting such relative rotation despite the fact that the first and second driving abutments 96 and 98 of the ratchet cap 68 project radially outwardly through this drive cap collar. Equally important, the drive cap 70 through its collar 100 has a driving abutment 102 which projects axially into circumferential interference with the first driving abutment 96 of the ratchet cap 68 when the ratchet cap is rotated in the counter clockwise direction as shown in each of FIGS. 12 and 13, said driving abutments moving circumferentially apart when the ratchet cap is rotated in the clockwise direction as shown in FIG. 7.

Rotation of the ratchet cap 68 in the counter clockwise direction as viewed from the right hand end of the dispensing roll center pin 72 will, therefore, rotate the drive cap 70 in the counter clockwise direction. Furthermore, the drive cap 70 is secured to the dispensing roll 30 through a pair of axially projecting drive pins 104 engaged into the dispensing roll, thereby transmitting the counter clockwise rotation to the dispensing roll. The dispensing roll center pin 72 projects totally axially through the dispensing roll 30 with the dispensing roll being rotatable relative thereto and the left hand end of the center pin being mounted similar to the right hand end although not shown in detail herein.

To complete the dispenser construction in providing the simpler forms of dispenser operation, it was previously pointed out that the dispensing roll center pin 72 projects through the mounting bar 86 of the mounting frame 24, as shown particularly in FIGS. 3, 6 and 10, after passing through and rotatably mounting a major part of the motion transfer means 28. At the right hand side of the mounting bar 86, the dispensing roll center pin 72 is engaged by a helical spring 106 as shown, which spring is also engaged forwardly with an end of a center pin 108 of the pressure roll 32 which projects through an elongated opening 110 of the mounting bar 86. The opposite end of the pressure roll center pin 108 is similarly mounted and this positions the pressure roll 32 freely rotatable on the center pin 108 forwardly of and resiliently urged rearwardly abutting the dispensing roll 30 as best seen in FIG. 3.

Thus, during the toweling web dispensing operations, the toweling web free end portion 46 projecting clockwise from the supply roll 34 as shown in FIG. 3 and previously described is threaded downwardly in the counter clockwise direction over the dispensing roll 30 engaged between the dispensing roll and the pressure roll 32. From between the dispensing and pressure rolls 30 and 32 the toweling web free end portion 46 is directed downwardly through an appropriate transverse dispensing slot 112 in a bottom wall 114 of the dispenser cabinet 20 so as to project downwardly exteriorly of the dispenser cabinet. As the toweling web free end portion 46 projects downwardly through the cabinet dispensing slot 112, it passes rearwardly of and forwardly against a serrated tearing edge 116 so that the dispensed portion thereof may be separated from that part of the toweling web not yet dispensed from the cabinet 20.

In the more usual operation of the dispenser of the present invention, therefore, the reciprocal operating lever 26 at the start of a dispensing operation is in its upper start position as shown in FIG. 3 and all elements of the dispenser are stationary. Commencing the dispensing operation, the reciprocal operating lever 26 is moved downwardly along the mounting frame slot 38 in its first or forward stroke as shown in FIG. 9 and initially, the operating lever will move ahead of the rack quadrant 50 as permitted by the spring 76, but by the time the operating lever has completed its full downward forward stroke as shown in FIG. 10, the rack quadrant 50 will have caught up with the operating lever so that both will have completed the maximum linear downward stroke fully extending the return spring 78 connected to the rack quadrant. The downward movement of the operating lever 26 and the rack quadrant 50 in this forward stroke, due to the engagement particularly shown in FIG. 6 and previously described, moves the rack quadrant first rack 52 along the first drive gear 56 rotating this first drive gear in the counter clockwise direction as viewed from the right hand side of the dispenser, while at the same time the rack quadrant second rack 54 moves along the second drive gear 58 and rotates this second drive gear opposite from the first drive gear 56 in the clockwise direction.

Rotation of the first drive gear 56 in the counter clockwise direction likewise rotates its connected first ratchet wheel 60 in the counter clockwise direction drivingly engaging the first ratchet finger 64 to drive or rotate the ratchet cap 68 in this same counter clockwise direction in the manner shown in FIG. 12. As also shown in FIG. 12, rotation of the second drive gear 58 simultaneously in the opposite clockwise direction drives the second ratchet wheel 62 in this clockwise direction so that no drive is transmitted to the ratchet cap 68, but rather the second ratchet finger 66 merely flops over the second ratchet wheel. Thus, in the downward forward stroke of the operating lever 26, the linear downward or forward movement is transferred into rotatable motion of the ratchet cap 68 solely in the counter clockwise direction due to the fact that the first drive gear and ratchet wheel 56 and 60 are moving in the counter clockwise direction and despite the fact that the second drive gear and ratchet wheel 58 and 62 are moving oppositely in the clockwise direction.

As the ratchet cap 68 rotates in this counter clockwise direction, this counter clockwise rotation is transmitted from the ratchet cap to the drive cap 70 through the ratchet cap first driving abutment 96 and the drive cap driving abutment 102 to, in turn, rotate the dispensing roll 30 in the counter clockwise direction through the drive pins 104. As can be determined from FIG. 3, rotation of the dispensing roll 30 in the counter clockwise direction progressively draws the toweling web free end portion 46 from the supply roll 34 between the dispensing roll and the pressure roll 32 and dispenses a length thereof exactly equal to the dispensing roll counter clockwise rotation downwardly through the cabinet dispensing slot 112. Such dispensing will cease upon the rack quadrant 50 coming to rest at the lower end of the forward dispensing stroke.

The reciprocal operating lever 26 is then released and the return spring 78 will move the operating lever upwardly carrying the rack quadrant 50 through upward engagement therebetween upwardly in the reverse return stroke ultimately back to the starting positions as shown in FIG. 3. This reversal of pivotal movement of the rack quadrant 50 will move the rack quadrant first rack 52 along the first drive gear 56 rotating this first drive gear in the reverse clockwise direction and will move the rack quadrant second rack 54 along the second drive gear 58 rotating this second drive gear in the reverse counter clockwise direction, simultaneously rotating the respective first and second ratchet wheels 60 and 62 in the same reverse and opposite directions. As shown in FIG. 13, in this reverse return stroke of the operating lever 26 and the rack quadrant 50, the now clockwise rotation of the first ratchet wheel 60 will not transmit rotational drive to the ratchet cap 60, but rather the first ratchet finger 64 will merely flop over the first ratchet wheel, while the now counter clockwise rotation of the second ratchet wheel 62 will transmit rotational drive to the ratchet cap through driving engagement with the second ratchet finger 66. During this reverse return stroke, therefore, only counter clockwise rotation of the ratchet cap 68 is again obtained and this ratchet cap counter clockwise rotation is similarly transmitted to the drive cap 70 and then to the dispensing roll 30 as before so as to continue to dispense a further length of the toweling web free end portion 46 from the dispenser.

Due to the unique arrangement of the motion transfer means 28 including the novel rack-gear and ratchet connections to the dispensing roll 30, therefore, lengths of the toweling web free end portion 46 are dispensed from the dispenser of the present invention in both the forward and reverse return strokes of the operating lever 26 and these operating lever movements, through the movements of the rack quadrant 50, will always carry out this dual movement dispensing. Furthermore, in view of the unique dual rack-gear and ratchet motion transfer connections, one always driving in the forward stroke and, in effect, idling in the reverse return stroke, and the other always idling in the forward stroke and driving in the reserve return stroke, with the changeover therebetween always being automatic upon any reversal of movement of the rack quadrant 50, it is obvious that reversal of the operating lever 26 and the rack quadrant 50 at any point during the forward stroke will still continue to cause dispensing back to the starting position along the remainder of the return stroke, the only consequence being that a lesser length of the toweling web free end portion 46 will be dispensed during such a shortened combined forward and reverse return stroke. Regardless of whether the operating lever 26 and the rack quadrant 50 are moved throughout their maximum strokes or whether they are moved along shortened strokes, at the completion thereof, the dispensed length of the toweling web free end portion 46 may be finally removed from the dispenser by tearing along the serrated tearing edge 116 at the cabinet bottom wall 114 completing the dispensing operation.

Although the dispenser construction thus far described will accomplish a dispensing operation in the unique manner and providing the distinct advantages as hereinbefore set forth, it is preferred to provide the dispenser of the present invention with certain additional refinements providing further advantages and solving certain further problems previously discussed. One of these further refinements is the provision of stroke adjustment means, that is, means whereby selectively adjustable means may be provided for selectively changing, in this case reducing, the maximum total length of the operating lever reciprocal strokes to thereby reduce the total length of the toweling web free end portion 46 which may be dispensed on one reciprocation of the operating lever. In the previous discussion, it was pointed out that dispensing of the toweling web free end portion 46 will take place during the entire movement away from and back to the starting position of the track quadrant 50 so that if this overall rack quadrant movement is effectively reduced, the total possible length of toweling web that may be dispensed on one reciprocal movement of the operating lever 26 will be likewise reduced.

Referring to FIGS. 3, 5 and 9, it is seen that at the starting position of the operating lever 26 and the rack quadrant 50, these elements rest upwardly against a resilient stop 118 mounted on a generally L-shaped bracket 120, which bracket is secured transversely against adjustment serrations 122 bordering an adjustment slot 124 of the mounting frame 24 by an adjustment screw 126. In the position shown in FIGS. 3, 5 and 9, the stop 118 is in its maximum upward position permitting the operating lever 26 and the rack quadrant 50 to move the maximum length of forward and reverse return strokes, but by selective readjustment downwardly of the stop merely by the loosening and retightening of the screw 126, this maximum stroke of the operating lever and the rack quadrant may be selectively reduced in the manner shown in FIG. 11. In view of the unique arrangement of the motion transfer means 28 as previously described, this shortening of the maximum stroke will not affect the smooth continued dispensing operation in both the forward and reverse return strokes of the operating lever 26 and the rack quadrant 50 in a single reciprocation and in repeated reciprocations, but the stroke shortening will shorten the total length of the toweling web free end portion 46 dispensed during a single reciprocation, thereby permitting selective adjustment of the toweling web lengths to be dispensed.

Another of the refinements incorporated in the dispenser of the present invention solving one of the problems previously discussed is a unique anti-milking means incorporated in the motion transfer means 28 and preventing the toweling web free end portion 46 to be milked from the dispenser during either rotation of the dispensing roll 30 or when such dispensing roll is stationary, that is, preventing a person operating the dispenser from grasping the toweling web being dispensed and pulling the same ahead of the dispensing roll movement during such movement or while the dispensing roll is stationary. This anti-milking means is best seen in FIGS. 6 through 8 and 12 through 15.

As previously described, the drive cap 70 includes a collar 100 which partially telescopes the collar 94 of the ratchet cap 68 as shown in FIG. 6, and as further shown in all of the figures referred to except FIGS. 8 and 14, the ratchet cap collar 94 terminates axially to the right in a radial flange 128 which pivotally mounts an anti-milking hook 150 through an axially extending pin 132. In the assembly of the ratchet cap 68 and the drive cap 70, the anti-milking hook 130 is positioned between the driving abutment 102 of the drive cap 70, that is, a generally radial actuating surface 134 on said abutment, and an angled actuating surface 136 of a circumferentially spaced drive cap second abutment 138.

In other words, the anti-milking hook 130, although generally radially pivotal relative to the ratchet cap 68 is tied circumferentially to and circumferentially movable with the ratchet cap, while this anti-milking hook lies circumferentially between the driving abutment 102 with its radial actuating surface 134 and the second abutment 138 with its angled actuating surface 136 on the drive cap 70, all as most clearly shown in FIGS. 7, 12 and 13. At the same time and as previously mentioned, the ratchet cap 68 and the drive cap 70, being separately rotatable on the center pin 72 of the dispensing roll 30, are permitted relative rotation of approximately 8 degrees despite their various interengaged abutments, the drive cap being permitted to move ahead of the ratchet cap counter clockwise until reversely engaging the ratchet cap ratchet fingers 96 and 98 as shown in FIG. 7. Now the anti-milking hook 130 is circumferentially positioned by its pin 132 on the ratchet cap 68 relative to the driving abutment 102 and second abutment 138 on the drive cap 70 so that when the first driving abutment 96 on the ratchet cap is circumferentially abutting the driving abutment 102 on the drive cap for transmitting counter clockwise dispensing roll driving motion therebetween as shown in FIGS. 12 and 13, the anti-milking hook 130 is pivoted radially inwardly in an inactive position, but when the drive cap rotates counter clockwise ahead of the ratchet cap, that is, relative clockwise rotation takes place therebetween until the drive cap engages the ratchet cap ratchet fingers 96 and 98, the radial actuating surface 134 acting against the noce of the anti-milking hook 130 forces this anti-milking hook to pivot radially outwardly and engage a toothed anti-milking surface 140 formed on the stationary mounting frame 24 as also shown in FIG. 7.

As can be seen in FIG. 6, the anti-milking surface 140 on the mounting frame 24 is radially aligned at all times with the anti-milking hook 130 so that this locking engagement between the anti-milking surface and the anti-milking hook must always take place when the anti-milking hook is pivoted radially outwardly by the radial actuating surface 134 on the drive cap driving abutment 102. When the ratchet cap 68 and the drive cap 70 shift circumferentially back to their counter clockwise rotation transmitting position of FIGS. 12 and 13, the angled actuating surface 136 on the drive cap second abutment 138 automatically acts against the anti-milking hook 130 and pivots the same inwardly away from the mounting frame anti-milking surface to the non-actuating position. Thus, any time that the ratchet cap 68 is transmitting rotational drive in the counter clockwise direction to the drive cap 70 by circumferential abutment between the ratchet cap first driving abutment 96 and the drive cap driving abutment 102, the anti-milking hook 130 is pivoted radially inwardly inactive, but any time the drive cap 70 is shifted counter clockwise rotationally ahead of the ratchet cap 68 circumferentially separating the drive cap driving abutment 102 by movement of the same counter clockwise ahead of the ratchet cap first driving abutment 96, the anti-milking hook 130 is immediately pivoted radially outwardly to active position engaging and locking with the mounting frame anti-milking surface 140.

As shown in FIGS. 8 and 14, a coil spring 142 is engaged offset radially and generally axially between the ratchet cap radial flange 128 and a similar radial flange 144 on the drive cap collar 100. When the ratchet cap 68 and the drive cap 70 are in their circumferentially abutting driving engagement transmitting counter clockwise drive between the ratchet cap and drive cap as shown in FIGS. 12 and 13, the coil spring 142 is circumferentially warped a maximum amount as shown in FIG. 14, and when the ratchet and drive cap are circumferentially shifted and separated, the drive cap being rotated counter clockwise ahead of the ratchet cap as shown in FIG. 7, the coil spring 142 is circumferentially warped a lesser or minimum amount. The consequence of this arrangement is that when the ratchet cap 68 is driven by the reciprocal operating lever 26 and the rack quadrant 50 through the motion transfer means 28, and the rachet cap closes into driving abutment with the drive cap 70 against and causing further warping of the coil spring 142, the anti-milking hook 130 is withdrawn as previously described permitting counter clockwise rotation of the ratchet and drive caps and, consequently, the dispensing roll 30, but when the ratchet cap is stopped no longer driven by the motion transfer means 28 or the drive cap is caused to rotatably overrun the drive from the ratchet cap by an overrunning force on the dispensing roll, the coil spring 142 causes the drive cap, with or without the aid of a dispensing roll overrunning force, to shift and move the anti-milking hook pivotally outwardly into locking engagement with the stationary mounting frame anti-milking surface 140.

The overall result of the coil spring 142 arrangement controlling the relative circumferential shifting of the ratchet cap 68 and the drive cap 70 for the non-locking and locking movements of the anti-milking hook 130 is that during normal rotational motion transfer by the motion transfer means 28 through the ratchet cap 68 and the drive cap 70 to the dispensing roll 30 by downward movement of the operating lever 26 in its forward stroke as shown in FIG. 12 and upward movement of the operating lever in its reverse return stroke as shown in FIG. 13, the coil spring 142 will be warped a maximum amount and the anti-milking hook 130 will be pivoted inwardly inactive as shown in FIGS. 12, 13 and 14. When no rotational drive is received by the ratchet cap 68 from the motion transfer means 28 caused by stopping of the operating lever 26 at any time, whether intermediate strokes or at the end of strokes, the coil spring 142 will immediately force the drive cap 70 to shift rotatably ahead of the ratchet cap 68 and cause outward pivoting of the anti-milking hook 130 to lock with the mounting frame anti-milking surface 140 and, thereby, lock the dispensing roll 30 against rotation in the counter clockwise direction so as to prevent removal of any portion of the toweling web free end portion 46 from the dispenser since this can only happen by counter clockwise movement of the dispensing roll. If, during an actual dispensing operation of the operating lever 26 driving the dispensing roll 30 in the counter clockwise direction through the motion transfer means 28 and the ratchet and drive caps 68 and 70, a force is applied to the toweling free end portion 56 being dispensed attempting to pull this toweling web ahead of the movement of the dispensing roll and thereby causing the drive cap 70 to rotationally overrun the ratchet cap 68, this overrunning force in the attempted milking and as aided by the coil spring 142 will shift the ratchet and drive caps causing the radial outward pivoting of the anti-milking hook 130 and the complete lock-up of the dispensing roll 30 in the counter clockwise direction so as to completely frustrate any attempted milking of the toweling web from the dispenser.

It is obvious that merely by a slight rearrangement of the coil spring 142 between the ratchet and drive caps 68 and 70, it is possible to arrange the relative rotation between the ratchet and drive caps so that these caps would remain in driving abutment during normal stopping of the operating lever 26 and the power transmission means 28, that is, the positions shown in FIGS. 12 and 13 with the anti-milking hook 130 inactive. In this arrangement, the coil spring 142 would have to be completely unwarped in the driving condition of the ratchet and drive caps 68 and 70, but yet caused to warp when a milking force was applied causing the drive cap 70 to overrun the ratchet cap 68 shifting rotationally relative to each other and activating the anti-milking hook 130 to lock, the warping of the coil spring 142 causing a return of the caps back to driving abutment when such milking force was ceased or relieved. The former arrangement previously described and shown in FIGS. 8 and 14 is, however, preferred in view of the added safety of always having the anti-milking hook 130 activated and locking the dispensing roll 30 during stopping of the operating lever 26, while still permitting proper counter clockwise rotation of the dispensing roll during normal dispensing, although guarding the same against attempted milking during such normal dispensing rotation.

A still further important advantage of the former arrangement of the coil spring 142 between the ratchet and drive caps 68 and 70 at all times remaining in at least a partially warped condition as previously described and shown in FIGS. 8 and 14, combined with the fact that the ratchet fingers 64 and 66 are loosely mounted on the ratchet cap 68, is that despite the ratchet fingers 64 and 66 being loosely connected to the ratchet 68, these ratchet fingers are always forced inwardly into proper driving engagement with their respective ratchet wheels 60 and 62 upon any reversal of movement of the drive gears 56 and 58 through reversal of stroke movement of the operating lever 26. In other words, if the ratchet fingers 64 and 66 were secured solidly to the ratchet cap 68 so that these ratchet fingers were required to lengthwise flex through the inherent resiliency or springing qualities thereof when the ratchet wheels are rotated in the clockwise or nondriving direction of rotation, not only would considerable noise be created, but equally as important, grealty increased wear of the two ratchet wheels 60 and 62 would take place and a greater frictional force would be created requiring a greater driving force from the operating lever 26. With the ratchet fingers 64 and 66 loosely attached to the ratchet cap 68, however, frictional wear between the ratchet fingers 64 and 66 and their respective ratchet wheels 60 and 62, when one or the other of the ratchet wheels is moving in the clockwise or nondriving direction, is reduced to an extent so as to be of virtually no consequence, permitting the ratchet wheels to be formed of a sound deadening plastic without fear of wear and eliminating the requirement of any increased forces to be transmitted by the operating lever 26 through the drive gears 56 and 58 to the ratchet wheels for overcoming any frictional drag.

At the same time, as a consequence of the coil spring 142 always being in a partially warped condition between forward and reverse return strokes of the operating lever 26 as shown in FIG. 8, forcing the ratchet and drive caps 68 and 70 to circumferentially shift relative to each other and, in turn, forcing the collar 100 of the drive cap 70 to bear circumferentially against both of the ratchet fingers 64 and 66 and into positive engagement with their respective ratchet wheels 60 and 62 as shown in FIG. 7, the ratchet fingers are at this time in ready engagement with their respective ratchet wheels and ready to receive positive driving from these ratchet wheels upon the ratchet wheels being rotated in the counter clockwise direction. This same condition, of course, is present when the operating lever 26 reaches the end of its reverse return stroke and must be reversed in direction to start a next forward stroke, as well as at any time that the direction of movement of the operating lever is reversed between its forward and reverse return strokes, even though the operating lever has not yet completed its total possible or maximum forward stroke. Thus, with the coil spring 142 always in a partially warped condition during any reversal of movement of the operating lever 26, the resultant circumferential shifting between the ratchet and drive caps 68 and 70 serves the added important function of always forcing the ratchet fingers 64 and 66 into positive engagement with their respective ratchet wheels 60 and 62 so that, despite which ratchet wheel has been previously driving to its ratchet finger and which ratchet wheel must now commence drive through its ratchet finger, proper driving engagement is always assured between the particular ratchet wheel and its ratchet finger required to commence drive even though the ratchet fingers are loosely mounted on the ratchet cap 68. Furthermore, the commencement of transmission of drive causes immediate circumferential reshifting of the relative positions of the ratchet and drive caps 68 and 70 as shown in FIG. 14 and either of FIGS. 12 and 13, depending on which ratchet wheel is driving, with the ratchet fingers then being relieved of pressure from the collar 100 of the drive cap 70 so that the particular finger not receiving drive can loosely flop over its respective ratchet wheel for proper functioning of the overall arrangement.

Still another refinement incorporated in the dispenser of the present invention is anti-overspin means best seen in FIGS. 3, 10 and 15. This anti-overspin means is necessary to prevent overspinning of the dispensing roll 30 beyond the normal counter clockwise rotation transferred through the motion transfer means 28 in the event the operating lever 26 is moved downwardly in its forward stroke with an inordinate force, such overspinning being caused by the momentum of the dispensing roll as caused by this excessive force. The anti-overspin means may also be provided for the same purpose actionable at the end of the operating lever reverse return stroke but this latter will be made inoperative upon certain selective adjustments of the stroke adjustment means hereinbefore described and as will be later explained.

Referring to FIGS. 3, 10 and 15, and as shown also in FIG. 16, the radial flange 128 on the collar 94 of the ratchet cap 68 terminates outwardly in a hooked or serrated anti-overspin surface 146, and as shown in FIGS. 3 and 10, a first anti-overspin dog 148 is secured to and extends downwardly from the rack quadrant 50, said dog being of proper length and positioned axially properly relative to the ratchet cap anti-overspin surface 146 so that locking engagement will take place therebetween at the end of the complete downward forward stroke of the operating lever 26 and the rack quadrant 50. This locking engagement is shown in FIG. 10 and will immediately stop the ratchet cap 68 and therefore the drive cap 70 and the dispensing roll 30 at the end of this downward forward stroke preventing the momentum of the dispensing roll from overrunning the movement of the operating lever 26 and the rack quadrant 50. Such locking engagement will immediately be released upon the rack quadrant 50 being started in its reverse return stroke by the release of the operating lever 26.

As shown in FIGS. 3 and 15, a similar second anti-overspin dog 150 similarly positioned may be formed projecting upwardly from the lower end of the rack quadrant 50 for locking engagement with the ratchet cap anti-overspin surface 146 at the end of the rack quadrant reverse return stroke if the stop 118 on the bracket 120 of the stroke adjustment means is adjusted in its fully upward position as shown in FIG. 3. If the stop 118 of the stroke adjustment means is adjusted downwardly, for instance, as shown in FIG. 11, engagement between the second anti-overspin dog 150 and the ratchet cap anti-overspin surface 146 cannot take place at the end of the reverse return stroke of the rack quadrant 50 since the stroke adjustment stop will retain these elements apart. When permitted to cause locking engagement, the second anti-overspin dog 150 engaging with the anti-overspin surface 146 on the ratchet cap 68 will again cause momentum of the dispensing roll 30 from overrunning the transfer of rotational motion from the operating lever 26 and the rack quadrant 50.

According to the present invention, therefore, a unique lever activated roll towel dispenser is provided wherein lengths of a toweling web free end portion 46 are dispensed from the dispenser during both forward and reverse return strokes of a reciprocal operating lever 26 through a unique motion transfer means 28. Furthermore, the reciprocal operating lever 26 may be reversed at any point along its strokes, that is, without necessarily completing full maximum strokes, and the toweling web dispensing will still take place during such shortened strokes, the only consequence being a shortened total length of the toweling web dispensed on the shortened stroke operation. This novel and advantageous dispenser operation is made possible by the unique motion transfer means 28 which converts linear reciprocating motion of the operating lever 26 into a single dispensing rotation of the dispensing roll 30 regardless of the linear direction of movement of the operating lever either in its forward stroke or its reverse return stroke and despite the reversal between the forward and return strokes at any point of linear movement of the operating lever.

The foregoing unique construction and arrangement of the motion transfer means 28 also makes possible the provision in the dispenser of the present invention selective stroke adjustment. Merely by the selective adjustment of a selectively movable stop 118 for the reciprocal operating lever 26 and its connected rack quadrant 50 of the motion transfer means 28, the maximum linear lengths of the operating lever and rack quadrant may be shortened which will result in a shorter length of toweling web being dispensed during a single operating lever reciprocation. In this manner, the maximum total length of toweling web dispensed from the dispenser upon a single reciprocation of the operating lever 26 may be controlled to that length of toweling web desired.

Still further, a unique anti-milking means may be incorporated within the motion transfer means 28 of the dispenser of the present invention which anti-milking means will frustrate any attempted milking of the toweling web from the dispenser whether the dispenser is being actuated or is at rest. While the dispensing operation of the toweling web is taking place, any attempted milking of the toweling web by exerting a force thereon attempting to cause the dispensing roll 30 to overrun the rotational motion being transferred thereto by the reciprocal operating lever 26, will cause an immediate locking of the dispensing roll against further dispensing rotation completely frustrating such attempted milking, yet release or cessation of such exterior force on the toweling web during continued actuation of the dispenser through the operating lever 26 and the motion transfer means 28 will immediately cause resumption of the proper regulated toweling web dispensing. At the same time, this anti-milking means preferably locks the dispensing roll 30 against toweling web dispensing rotation at any time the dispenser is not being actuated, thereby totally frustrating attempted milking during the "at rest" periods.

Still additionally, the unique motion transfer means 28 of the present invention makes use of a pair of driving ratchet wheels 60 and 62 which always rotate respecively in reverse directions and drive through the ratchet fingers 64 and 66 so as to drive the dispensing roll 30 in the single direction of rotation despite the reversal of direction of the operating lever 26, yet these ratchet fingers 64 and 66 are connected to their mounting ratchet cap 68 in a loose fashion so as to permit the ratchet fingers to flop over the ratchet wheels when not receiving drive therefrom reducing friction and drag therebetween to almost zero. All of this is further permitted while still maintaining proper positive drive between the then required to drive ratchet finger 64 or 66 and its respective ratchet wheel 60 or 62 by a unique circumferential shifting between interfitting and power transmitting parts of the motion transfer means 28, namely, the uniquely formed and arranged ratchet and drive caps 68 and 70 as controlled by the coil spring 142 connected axially therebetween. Despite the loose connection of the ratchet fingers 64 and 66 to their mounting ratchet caps 68, the coil spring 142 always exerts a circumferential shifting force between the ratchet and drive caps 68 and 70 so that at any time that the driving rotation of the ratchet wheels 60 and 62 is stopped in either rotational direction, the coil spring 142 immediately causes relative circumferential shifting between the ratchet and drive caps 68 and 70 with the drive cap 70, in turn, bearing against the loosely connected ratchet fingers 64 and 66 so as to force the same into positive driving engagement with their respective ratchet wheels 60 and 62. In this manner, the engaged parts are ready for resumption of drive transmission through one or the other of the ratchet wheels and its respective ratchet finger despite the direction of rotation of the ratchet wheels when such rotation is resumed. Thus, the unique motion transfer means 28 provides positive motion transfer therethrough despite required reversals in direction of drive by the operating lever 26, yet ratchet wheel and finger arrangements therein operate with a minimum of noise, wear and friction drag.

Also, according to the principles of the present invention, a highly simplified and unique anti-overspin means may be provided to prevent inordinate operation of the dispenser causing the momentum of the dispensing roll 30 from overspinning the normal transfer of rotational motion from the operating lever 26 through the motion transfer means 28. This unique anti-overspin means is provided at least for operation at the end of the downward forward stroke of the operating lever 26 and the motion transfer means 28 which could be caused by an excessive downward force on the operating lever by a person operating the dispenser. Anti-overspin at the end of the reverse return stroke of the operating lever 26 and the motion transfer means 28 is of less importance since these elements are normally returned to their starting position by the determined spring force, that is, the helical spring 78 between the mounting frame 24 and the rack quadrant 50 of the motion transfer means 28.

We claim:

1. In a dispensing device having a roll for rotation in a single direction to dispense a continuous web of material engaged therewith, the combination of: a frame; a roll rotatable on said frame about a fixed center of rotation relative to said frame; an operating lever reciprocal on said frame in an arcuate path about a fixed center movable in a first direction from a starting position along a determined maximum stroke and in a reverse return direction back to said starting position; and motion transfer means including arcuately extending rack means reciprocal on said frame in an arcuate path about said operating lever fixed center constantly engaged with gear means rotatable about fixed centers on said frame, said rack means and gear means being operably connected between said operating lever and said roll having certain parts effectively operable during said operating lever first direction movement to rotate said roll in said single direction of rotation and effectively inoperable during said operating lever return direction movement, and certain other parts effectively inoperable during said operating lever first direction movement and effectively operable during said operating lever return direction movement to rotate said roll in said single direction of rotation, said certain parts and said certain other parts being constructed and arranged automatically changing between being effectively operable and inoperable upon reversal of said operating lever direction of movement at any point along said operating lever determined maximum stroke; said rack means of said motion transfer means being separately movable from said operating lever with resilient means therebetween for rack means following movement during operating lever first direction movement and with engagement means therebetween for rack means exact simultaneous movement during operating lever return direction movement.

2. In a dispensing device having a roll for rotation in a single direction to dispense a continuous web of material engaged therewith, the combination of: a frame; a roll rotatable on said frame about a fixed center of rotation relative to said frame; an operating lever reciprocal in an arcuate path about a fixed center on said frame movable in a first direction and in a reverse return direction; and motion transfer means operably connected between said operating lever and said roll for automatically transferring said operating lever reciprocal motion into rotation of said roll in a single direction of rotation including first drive means constantly connected to both said operating lever and said roll automatically movable in a driving condition rotating said roll in said single direction during movement of said operating lever in said first direction and automatically movable in an idle condition free of rotating said roll during movement of said operating lever in said reverse direction, second drive means constantly connected to both said operating lever and said roll automatically moving in an idle condition free of rotating said roll during movement of said operating lever in said first direction and automatically movable in a driving condition rotating said roll in said single direction during movement of said operating lever in said reverse direction; each of said first and second drive means of said motion transfer means including rack and gear assembly constantly connected between said operating lever and said roll, said rack and gear assembly of said first drive means being constructed and arranged effectively transferring said operating lever first direction movement into roll rotation in said single direction and ineffective to transfer said operating lever return direction movement, said rack and gear assembly of said second drive means being constructed and arranged ineffective to transfer said operating lever first direction movement and effectively transferring said operating lever return direction movement into roll rotation in said single direction of rotation, said racks of said rack and gear assemblies extending arcuately and generally facing and being simultaneously arcuately reciprocal generally with said operating lever about said operating lever fixed center constantly engaged with their respective gears, said gears of said rack and gear assemblies being separately rotatable about fixed centers in opposite directions of rotation.

3. A device as defined in claim 1 in which said racks of said rack and gear assemblies are mounted on a common rack quadrant reciprocal about said operating lever fixed center separate from said operating lever with resilient means between said quadrant and lever for quadrant following movement during said lever first direction movement and with engagement means therebetween for quadrant exact simultaneous movement during said lever return direction movement.

4. A device as defined in claim 1 in which said first and second drive means of said motion transfer means include said gears of said first and second drive means being positioned relative to and operably connected to their respective racks for opposite rotation during said operating lever first direction movement and reversely opposite lever first direction movement and reversely opposite rotation during said operating lever return direction movement, ratchet means operably connected between said first drive means gear and said roll rotating said roll in said single direction of rotation during said operating lever first direction movement and ineffective to rotate said roll in said operating lever return direction of movement, ratchet means operably connected between said second drive means gear and said roll ineffective for rotating said roll in said operating lever first direction of movement and rotating said roll in said single direction of rotation during said operating lever return direction of movement; and in which said racks of said rack and gear assemblies are mounted on a common rack quadrant reciprocal about said operating lever fixed center separate from said operating lever with resilient means between said quadrant and lever for quadrant following movement during said lever first direction movement and with engagement means therebetween for quadrant exact simultaneous movement during said lever return direction movement.

5. A device as defined in claim 1 in which said first and second drive means on said motion transfer means include said gears of said first and second drive means being positioned relative to and operably connected to their respective racks for opposite rotation during said operating lever first direction movement and reversely opposite rotation during said operating lever return direction movement, ratchet means operably connected between said first drive means gear and said roll rotating said roll in said single direction of rotation during said operating lever first direction movement and ineffective to rotate said roll in said operating lever return direction of movement, ratchet means operably connected between said second drive means gear and said roll ineffective for rotating said roll in said operating lever first direction of movement and rotating said roll in said single direction of rotation during said operating lever return direction of movement; said racks of said rack and gear assemblies are mounted on a common rack quadrant reciprocal about said operating lever fixed center separate from said operating lever with resilient means between said quadrant and lever for quadrant following movement during said lever first direction movement and with engagement means therebetween for quadrant exact simultaneous movement during said lever return direction movement and in which said roll is a dispensing roll and has a rotatable pressure roll resiliently bearing radially thereagainst engaging a continuous web of material between said dispensing and pressure rolls directed from a supply roll of said dispenser, said continuous web of material being drawn from said supply roll and having lengths thereof dispensed from said dispenser by said dispensing roll rotation in said single direction of rotation as determined by said operating lever first and return direction movements.

6. In a dispenser device for dispensing a continuous web of material therefrom during actuation thereof, the combination of: a frame; dispenser roll means rotatable on said frame engaged with a continuous web of material and dispensing a portion of said web of material upon and with rotation of said dispenser roll means in a single direction of rotation; an operating lever reciprocal on said frame movable in a first direction and in a reverse return direction; motion transfer means operably connected between said operating lever and said dispenser roll means for automatically transferring motion of said operating lever in at least one of said directions into rotation of said dispenser roll means in said single direction of rotation; and anti-milking means operably connected to said dispenser roll means automatically free of actuation during normal rotation of said dispenser roll means in said single direction by said actuating lever and automatically actionable to lock said dispenser roll means against rotation at least upon a force being applied to said dispensed portion of said web of material attempting to overrun said dispenser roll means rotation during said rotation and attempting to rotate said dispenser roll means when said dispenser roll means is stationary.

7. A dispenser device as defined in claim 6 in which said anti-milking means is constructed and arranged locking said dispenser roll means against rotation at all times during which said motion transfer means is free of transferring said operating lever motion into said dispenser roll means rotation.

8. A dispenser device as defined in claim 6 in which said motion transfer means includes rack and gear means operably connected between said operating lever and said dispenser roll means, said rack and gear means having parts operable automatically transferring motion of said operating lever in said operating lever first direction into rotation of said dispenser roll means in said single direction of rotation and inoperable during said operating lever return direction movement, said rack and gear means having other parts inoperable during said operating lever first direction movement and operable automatically transferring motion of said operating lever in said return direction movement into rotation of said dispenser roll means in said single direction of rotation.

9. A dspenser device as defined in claim 6 in which said anti-milking means includes relatively rotatable members operably associated with said dispenser roll means and said motion transfer means normally retained in a first rotatable position during normal rotation of said dispenser roll means in said single direction of rotation by said motion transfer means and movable to a second rotational position at least upon a force being applied to said dispensed portion of said web of material attempting to overrun said dispenser roll means normal rotation, said relatively rotatable members automatically returning to said first rotatable position upon normal rotation of said dispenser roll means in said single direction of rotation being resumed free of said force being applied to said dispensed portion of said web of material, means automatically actionable by said relatively rotatable members upon movement of said relatively rotatable members to said second rotatable position for locking said dispenser roll means against rotation.

10. A dispenser device as defined in claim 6 in which said anti-milking means includes relatively rotatable members operably associated with said dispenser roll means and said motion transfer means normally retained in a first rotatable position during normal rotation of said dispenser roll means in said single direction of rotation by said motion transfer means and movable to a second rotational position at least upon a force being applied to said dispensed portion of said web of material attempting to overrun said dispenser roll means normal rotation, said relatively rotatable members automatically returning to said first rotatable position upon normal rotation of said dispenser roll means in said single direction of rotation being resumed free of said force being applied to said dispensed portion of said web material, pivotal hook means operably connected between said relatively rotatable members free of actuation when said relatively rotatable members are in said first rotatable position and automatically movable into engagement with a stationary part of said frame upon said relatively rotatable members being moved to said second rotatable position.

11. A dispenser device as defined in claim 6, in which said anti-milking means includes relatively rotatable members operably associated with said dispenser roll means and said motion transfer means normally retained in a first rotatable position during normal rotation of said dispenser roll means in said single direction of rotation by said motion transfer means and movable to a second rotational position at least upon a force being applied to said dispensed portion of said web of material attempting to overrun said dispenser roll means normal rotation, said relatively rotatable members automatically returning to said first rotatable position upon normal rotation of said dispenser roll means in said single direction of rotation being resumed free of said force being applied to said dispensed portion of said web material, pivotal hook means operably connected between said relatively rotatable members free of actuation when said relatively rotatable members are in said first rotatable position and automatically movable into engagement with a stationary part of said frame upon said relatively rotatable members being moved to said second rotatable position resilient means operably connected between said relatively rotatable members resiliently urging said relatively rotatable members into said second rotatable position at any time said dispenser roll means is free of rotation in said single direction of rotaton by said motion transfer means.

12. A dispenser device as defined in claim 6 in which said anti-milking means includes relatively rotatable members operably associated with said dispenser roll means and said motion transfer means normally retained in a first rotatable position during normal rotation of said dispenser roll means in said single direction of rotation by said motion transfer means and movable to a second rotational position at least upon a force being applied to said dispensed portion of said web of material attempting to overrun said dispenser roll means normal rotation, said relatively rotatable members automatically returning to said first rotatable position upon normal rotation of said dispenser roll means in said single direction of rotation being resumed free of said force being applied to said dispensed portion of said web material, pivotal hook means operably connected between said relatively rotatable members free of actuation when said relatively rotatable members are in said first rotatable position and automatically movable into engagement with a stationary part of said frame upon said relatively rotatable members being moved to said second rotatable position, resilient means operably connected between said relatively rotatable members resiliently urging said relatively rotatable members into said second rotatable positions at any time said dispenser roll means is free of rotation in said single direction of rotation by said motion transfer means; and in which said motion transfer means includes first rack means operably connected to said operating lever reciprocally movable with said operating lever and first gear means engaged with said first rack means ratchet connected to said dispenser roll means rotating said dispenser roll means in said single direction of rotation during movement of said operating lever in said first direction and being free of rotating said dispenser roll means in movement of said operating lever in said return direction, second rack means operably connected to said operating lever reciprocally movable with said operating lever and second gear means engaged with said first rack means and ratchet connected to said dispenser roll means free of rotating said dispenser roll means in movement of said operating lever in said first direction and rotating said dispenser roll means in said single direction of rotation during movement of said operating lever in said return direction.

13. In a device having a member for rotation in a single direction, the combination of: a frame; a member rotatable on said frame about a fixed center of rotation relative to said frame; an operating lever reciprocal on said frame movable in a first direction from a starting position along a determined stroke to a stop position and then in a reverse return direction back to said starting position; motion transfer means operably connected between said operating lever and said rotatable member for automatically exactly transferring motion of said operating lever in at least said first direction into rotation of said rotatable member in said single direction of rotation, said motion transfer means including a rack generally reciprocal with said operating lever engaged with a gear rotatable about a fixed center on said frame, said gear being operably connected to said rotatable member; and anti-overspin means operably connected to said rotatable member inactive during movement of said operating lever between said starting and stop positions and automatically actionable upon cessation of said exact transfer of said operating lever motion into said rotatable member rotation with said operating lever arrival at said stop position locking said rotatable member against further rotation caused by rotational momentum, said anti-overspin means including a dog movable with said rack of said motion transfer means positively engageable in teeth of said gear of said motion transfer means upon said operating lever arrival at said stop position locking said gear and said rotatable member against further rotation and disengaging said gear upon commencement of rack reverse return movement.

14. A device as defined in claim 13 in which said rotatable member is a roll of a dispenser having a web of material constantly engaged therewith moving said web in a single dispensing direction upon rotation of said roll in said single direction of rotation; and in which said dog of said anti-overspin positively engages and locks said gear and said roll and material web upon said operating lever arrival at said stop position.

15. In a method of dispensing a continuous web of material, the steps of: reciprocally moving an operating lever arcuately about a fixed center in a first direction along a preset path and arcuately about said fixed center in a reverse return direction oppositely back along said path; and during said operating lever reciprocal movement, transferring said first direction arcuate movement into first gear and rack means movement including arcuate movement of an arcuate rack about said operating lever fixed center and in turn into single direction rotational movement of a roll to dispense a continuous web of material engaged with said roll and transferring said return direction arcuate movemnet into second gear and rack means movement including arcuate movement of an arcuate rack about said operating lever fixed center and in turn into the same single direction rotational movement of said roll to continue to dispense said continuous web of material.

16. A method of dispensing a continuous web of material as defined in claim 15 in which said method includes the step of reversing said operating lever reciprocal arcuate movement in said first direction at any point along said preset path and immediately moving said operating lever in said reverse return direction oppositely arcuately back along said path while still transferring said first and return direction arcuate movements into said rack arcuate movement and in turn into said single direction rotational movement of said roll throughout said operating lever and rack arcuate movements.

17. A method of dispensing a continuous web of material as defined in claim 15 in which said step of transferring said first and return direction arcuate movements of said operating lever into said single direction rotational movement of said roll includes transferring said operating lever first direction arcuate movement into arcuate movement of said first and second gear and rack means racks through resilient means and operating lever second direction movement into said racks through a rigid engagement, transferring said operating lever first direction arcuate movement into movement of said first gear and rack means in a driving condition and transferring said operating lever return direction arcuate movement into said first gear and rack means in an idle condition, transferring said operating lever first direction arcuate movement into said second gear and rack means in an idle condition and transferring said operating lever return direction arcuate movement into said second gear and rack means in a driving condition, consecutively transferring only said first and second gear and rack driving condition movements into said single direction rotational movement of said roll.

18. A method of dispensing a continuous web of material as defined in claim 15 in which said method includes the step of reversing said operating lever reciprocal arcuate movement in said first direction at any point along said preset path and immediately moving said operating lever in said reverse return direction oppositely arcuately back along said path while still transferring said first and return direction arcuate movements into said rack arcuate movements and in turn into said single direction rotational movement of said roll throughout said operating lever and rack arcuate movements; and in which said step of transferring said first and return direction arcuate movements of said operating lever into said single direction rotational movement of said roll includes transferring said operating lever first direction arcuate movement into arcuate movement of said first and second gear and rack means racks through resilient means and operating lever second direction movement into said racks through a rigid engagement, transferring said operating lever first direction arcuate movement into movement of said first gear and rack means in a driving condition and transferring said operating lever return direction arcuate movement into said first gear and rack means in an idle condition, transferring said operating lever first direction arcuate movement into said second gear and rack means in an idle condition and transferring said operating lever return direction arcuate movement into said second gear and rack means in a driving condition, consecutively transferring only said first and second gear and rack driving condition movements into said single direction rotational movement of said roll.

19. A method of dispensing a continuous web of material as defined in claim 15 in which said method includes the step of reversing said operating lever reciprocal arcuate movement in said first direction at any point along said present path and immediately moving said operating lever in said reverse return direction oppositely arcuately back along said path while still transferring said first and return direction arcuate movements into said rack arcuate movements and in turn into said single direction rotational movement of said roll throughout said operating lever and rack arcuate movements; in which said step of transferring said first and return direction arcuate movements of said operating lever into said single direction rotational movement of said roll includes transferring said operating lever first direction arcuate movement into arcuate movement of said first and second gear and rack means racks through resilient means and operating lever second direction movement into said racks through a rigid engagement, transferring said operating lever first direction arcuate movement into movement of said first gear and rack means in a driving condition and transferring said operating lever return direction arcuate movement into said first gear and rack means in an idle condition, transferring said operating lever first direction arcuate movement into second gear and rack means in an idle condition and transferring said operating lever return direction arcuate movement into said second gear and rack means in a driving condition, consecutively transferring only said first and second gear and rack driving condition movements into said single direction rotational movement of said roll; in which said method includes the step of directing said continuous web of material from a supply roll between constantly abutting rotatable dispensing and pressure rolls; and in which said step of transferring said first and return direction arcuate movements of said operating lever into said single direction rotational movement of said roll includes the transferring of said first and return direction arcuate movements of said operating lever into single direction rotational movement of said dispensing roll to dispense said continuous web of material from between said dispensing and pressure rolls.

20. In a method of dispensing a continuous web of material, the steps of: reciprocally moving an operating lever linearly in a first direction along a preset path and linearly in a reverse return direction oppositely back along said path; during said operating lever movement in at least one of said first and return directions, transferring said operating lever linear movement into single direction rotational movement of a roll to dispense a continuous web of material engaged with said roll; maintaining said continuous web of material engaged with said roll during and between said roll rotational movements; and locking said roll against said roll single direction rotational movement in the event a force is applied to the dispensed portion of the continuous web of material causing said roll single direction rotational movement to rotationally overrun said transfer of said operating lever linear movement while normally maintaining said roll free of said locking at least during said transfer of said movement without said application of said force.

21. A method of dispensing a continuous web of material as defined in claim 20 in which said method includes the step of locking said roll against said roll single direction rotational movement at all times that said single direction rotational movement is not being transferred to said roll.

22. A method of dispensing a continuous web of material as defined in claim 20 in which said step of transferring said operating lever linear movement includes the transferring of said operating lever linear movement in both said first and return directions into said single direction rotational movement of said roll to dispense a continuous web of material engaged with said roll.

23. A method of dispensing a continuous web of material as defined in claim 20 in which said step of transferring said operating lever linear movement includes the transferring of said operating lever linear movement in both said first and return dierctions into said single direction rotational movement of said roll to dispense a continuous web of material engaged with said roll; and in which said method includes the step of locking said roll against said roll single direction rotational movement at all times that said single direction rotational movement is not being transferred to said roll.

24. A method of dispensing a continuous web of material as defined in claim 20 in which said step of transferring said operating lever linear movement includes the transferring of said operating lever linear movement in both said first and return directions into said single direction rotational movement of said roll to dispense a continuous web of material engaged with said roll; in which said step of reciprocally moving said operating lever includes the reciprocally moving of said operating lever linearly in said first direction along said preset path and reversing said lever movement at any point within the distance of a determined maximum stroke for said linear movement in said reverse return direction oppositely back along said path; and in which said step of transferring said first and return direction linear movements of said operating lever into said single direction rotational movement of said roll includes said transferring of said operating lever movements into said single direction rotational movement of said roll regardless of said operating lever movement reversal at any point within said determined maximum stroke.

25. A method of dispensing a continuous web of material as defined in claim 20 in which said step of transferring said operating lever linear movement includes the transferring of said operating lever linear movement in both said first and return directions into said single direction rotational movement of said roll to dispense a continuous web of material engaged with said roll; in which said step of reciprocally moving said operating lever includes the reciprocally moving of said operating lever linearly in said first direction along said preset path and reversing said lever movement at any point within the distance of a determined maximum stroke for said linear movement in said reverse return direction oppositely back along said path; in which said step of transferring said first and return direction linear movements of said operating lever into said single direction rotational movement of said roll includes said transferring of said operating lever movements into said single direction rotational movement of said roll regardless of said operating lever movement reversal at any point within said determined maximum stroke; and in which said method includes the step of locking said roll against said roll single direction rotational movement at all times that said single direction rotational movement is not being transferred to said roll.

26. A method of dispensing a continuous web of material as defined in claim 20 in which said step of transferring said operating lever linear movement includes the transferring of said operating lever linear movement in both said first and return directions into said single direction rotational movement of said roll to dispense a continuous web of material engaged with said roll; in which said method includes the step of locking said roll against said roll single direction rotational movement at all times that said single direction rotational movement is not being transferred to said roll; in which said step of transferring said operating lever linear movements into said single direction rotational movement of said roll includes the transferring of said operating lever linear movements into said single direction rotational movement of a dispensing roll having said continuous web of material engaged therewith and directed from a supply roll; and in which said step of maintaining said continuous web of material engaged with said roll includes the maintaining of said continuous web of material engaged with said dispensing roll by forcing said web against said dispensing roll with a pressure roll and dispensing said web from between said dispensing and pressure rolls upon said dispensing roll single direction rotational movements.

27. A method of dispensing a continuous web of material as defined in claim 20 in which said step of transferring said operating lever linear movement includes the transferring of said operating lever linear movement in both said first and return directions into said single direction rotational movement of said roll to dispense a continuous web of material engaged with said roll; in which said step of reciprocally moving said operating lever includes the reciprocally moving of said operating lever linearly in said first direction along said preset path and reversing said lever movement at any point within the distance of a determined maximum stroke for said linear movement in said reverse return direction oppositely back along said path; in which said step of transferring said first and return direction linear movements of said operating lever into said single direction rotational movement of said roll includes said transferring of said operating lever movements into said single direction rotational movement of said roll regardless of said operating lever movement reversal at any point within said determined maximum stroke; in which said method includes the step of locking said roll against said roll single direction rotational movement at all times that said single direction rotational movement is not being transferred to said roll; in which said step of transferring said operating lever linear movement into said single direction rotational movement of said roll includes the transferring of said operating lever linear movement into said single direction rotational movement of a dispensing roll having said continuous web of material engaged therewith and received from a supply roll; and in which said step of maintaining said continuous web of material engaged with said roll includes the maintaining said continuous web of material engaged with said dispensing roll by abutting a pressure roll against said dispensing roll with said continuous web engaged therebetween and dispensed from between said dispensing and pressure rolls during said single direction rotational movement of said dispensing roll.

28. In a method of dispensing a continuous web of material, the step of: reciprocally moving an operating lever linearly in a first direction along a preset path and linearly in a reverse return direction oppositely back along said path; during said operating lever movement in both said first and second directions, transferring said operating lever linear movement into single direction rotational movement of a dispensing roll to dispense a continuous web of material engaged with said dispensing roll and received from a supply roll; maintaining said continuous web of material engaged with said dispensing roll during and between said dispensing roll rotational movements by abutment of a pressure roll against said web of material and forcing said web of material against said dispensing roll; and locking said roll at the end of normal transfer of said operating lever movement to said roll single direction movement in said operating lever first direction preventing momentum of said roll from causing overrunning of said normal transfer of said movement while maintaining said roll free of said locking during said normal transfer of said movement.

29. A method of dispensing a continuous web of material as defined in claim 28 in which said method includes the locking of said dispensing roll at the end of normal transfer of said operating lever movement to said dispensing roll single direction movement in said operating lever return direction preventing momentum of said dispensing roll from causing overrunning of said normal transfer of said movement while maintaining said dispensing roll free of said locking during said normal transfer of said movement.

30. In a device having a member for rotation in a single direction, the combination of: a rotatably mounted driven member; a rotatably mounted driving member rotatable in driving and opposite non-driving directions of rotation; a rotatably mounted drive cap operably connected transmitting rotational drive to said driven member upon said drive cap being rotated; a rotatably mounted ratchet wheel operably connected to said driving member, said ratchet wheel being rotated in a driving direction of rotation when said driving member is rotated in said driving member driving direction of rotation and being rotated in a non-driving direction of rotation when said driving member is rotated in said driving member non-driving direction of rotation; a rotatably mounted ratchet cap axially aligned adjacent said drive cap having connection means engaging and rotating said drive cap when said ratchet cap is rotated in driving direction of rotation common to said ratchet wheel driving direction of rotation and permitting said drive cap to shift relatively circumferentially ahead of said ratchet cap a limited amount in said driving direction of rotation upon said ratchet cap being free of transmitting rotation to said drive cap in said driving direction of rotation; resilient means operably connected between said ratchet and drive caps shifting said drive cap relatively circumferentially ahead of said ratchet cap said limited amount when said ratchet cap is free of transmitting rotation to said drive cap in said driving direction of rotation and through the resiliency thereof permitting said rotating engagement therebetween when said ratchet cap is rotated in said driving direction; and a ratchet finger connected to said ratchet cap extending angularly generally radially and engaging said ratchet wheeel, said ratchet finger having mounting means generally radially loosely connecting said ratchet finger to said ratchet cap permitting driving engagement between said ratchet finger and said ratchet wheel when said ratchet wheel, said ratchet finger having mounting transmitting rotation in said driving direction to said ratchet cap and permitting said ratchet finger to loosely flop over said ratchet wheel when said ratchet wheel is rotated in said non-driving direction of rotation, said ratchet finger being engaged by parts of said drive cap and forced generally radially into said driving engagement with said ratchet wheel when said drive cap is shifted relatively circumferentially ahead of said ratchet cap said limited amount.

31. A device as defined in claim 30 in which said resilient means in a spring extending generally axially between said ratchet and drive caps, said spring through the resiliency thereof warping in a generally circumferential direction permitting said rotating engagement between said ratchet and drive caps when said ratchet cap is rotated in said driving direction.

32. A device as defined in claim 30 in which said resilient means is a spring extending generally axially between said ratchet and drive caps, said spring being warped in a generally circumferential direction when said drive cap is shifted relatively circumferentially ahead of said ratchet cap said limited amount and being warped a greater amount through the resiliency thereof permitting said rotating engagement between said ratchet and drive caps when said ratchet cap is rotated in said driving direction.

33. A device as defined in claim 30 in which said drive cap includes parts telescoped over said ratchet cap; in which said ratchet cap includes parts telescoped over said ratchet wheel; and in which said ratchet finger extends angularly generally radially inwardly from said ratchet cap and into engagement with said ratchet wheel.

34. In a device having a member for rotation in a single direction, the combination of: a rotatably mounted driven member; first and second rotatably mounted driving members, each of said driving members being rotatable in driving and opposite non-driving directions of rotation; a rotatably mounted cap operably connected transmitting rotational drive to said driven member upon said drive cap being rotated; first and second rotatably mounted ratchet wheels operably connected respectively to said first and second driving members; each of said ratchet wheels being rotated in a common driving direction of rotation when its driving member is rotated in said driving member driving direction of rotation and being rotated in a common non-driving drection of rotaton when its driving member is rotated in said driving member non-driving direction of rotation; a rotatably mounted ratchet cap axially aligned adjacent said drive cap having connection means engaging and rotating said drive cap when said ratchet cap is rotated in a driving direction of rotation common to said first and second ratchet wheel driving direction of rotation and permitting said drive cap to shift relatively circumferentially ahead of said ratchet cap a limited amount in said driving direction of rotation upon said ratchet cap being free of transmitting rotation to said drive cap in said driving direction of rotation; resilient means operably connected between said ratchet and drive caps shifting said drive cap relatively circumferentially ahead of said ratchet cap said limited amount when said ratchet cap is free of transmitting rotation to said drive cap in said driving direction of rotation and through the resiliency thereof permitting said rotating engagement therebetween when said ratchet cap is rotated in said driving direction; and first and second ratchet fingers connected to said ratchet cap extending angularly generally radially and respectively engaging said first and second ratchet wheels, said ratchet fingers having mounting means generally radially loosely connecting said ratchet fingers to said ratchet cap permitting driving engagement between said ratchet fingers and their ratchet wheels when said ratchet wheels are rotated in said driving direction transmitting rotation in said driving direction to said ratchet cap and permitting said ratchet fingers to loosely flop over their ratchet whels when said ratchet wheels are rotated in said non-driving direction of rotation, both said ratchet fingers being engaged by parts of said drive cap and forced generally radially into said driving engagement with their ratchet wheels when said drive cap is shifted relatively circumferentially ahead of said ratchet cap said limited amount.

35. A device as defined in claim 34 in which said resilient means is a spring extending generally axially between said ratchet and drive caps, said spring through the resiliency thereof being warped in a generally circumferential direction permitting said rotating engagement between said ratchet and drive caps when said ratchet cap is rotated in said driving direction.

36. A device as defined in claim 34 in which said ratchet cap includes parts telescoping over said ratchet wheels; and in which said ratchet fingers extend angularly generally radially inwardly from said ratchet cap respectively engaging their ratchet wheels.

37. A device as defined in claim 34 in which said drive cap includes parts telescoped over said ratchet cap; in which said ratchet cap includes parts telescoped over said ratchet wheels; and in which said ratchet fingers extend angularly generally radially inwardly from said ratchet cap respectively into engagement with their ratchet wheels.

38. A device as defined in claim 34 in which said resilient means includes a spring extending generally axially between said ratchet and drive caps, said spring through the resiliency thereof warping in a generally circumferential direction permitting said rotating engagement between said ratchet and drive caps when said ratchet cap is rotated in said driving direction; in which said drive cap includes parts telescoped over said ratchet cap; in which said ratchet cap includes parts telescoped over said ratchet wheels; and in which said ratchet fingers extend angularly generally radially inwardly from said ratchet cap respectively into engagement with their ratchet wheels.

39. In a device having a member for rotation in a single direction, the combination of: a frame; a member rotatable on said frame about a fixed center of rotation relative to said frame; an operating lever reciprocal on said frame movable in a first direction from a starting position along a determined stroke to a stop position and then in a reverse return direction back to said starting position; motion transfer means operably connected between said operating lever and said rotatable member for automatically exactly transferring motion of said operating lever in both said first and return directions into rotation of said rotatable member in said single direction of rotation; and anti-overspin means operably connected to said rotatable member inactive during movement of said operating lever between said starting and stop positions and automatically actionable upon cessation of said exact transfer of said operating lever motion into said rotatable member rotation with said operating lever arrival at said stop position in said first direction and with said operating lever arrival at said starting position in said return direction locking said rotatable member against further rotation caused by rotational momentum.

40. A device as defined in claim 39 in which said rotatable member is a roll of a dispenser having a web of material engaged therewith moving said web in a single dispensing direction upon rotation of said roll in said single direction of rotation; and in which said motion transfer means includes first drive means constantly connected to both said operating lever and said rotatable roll automatically movable in a driving condition rotating said roll in said single direction during movement of said operating lever in said first direction and automatically movable in an idle condition free of rotating said roll during movement of said operating lever in said reverse direction, second drive means constantly connected to both said operating lever and said roll automatically moving in an idle condition free of rotating said roll during movement of said operating lever in said first direction and automatically movable in a driving condition rotating said roll in said single direction during movement of said operating lever in said reverse direction.

41. In a method of dispensing a continuous web of material, the steps of: reciprocally moving an operating lever arcuately about a fixed center in a first direction along a preset path and arcuately about said fixed center in a reverse return direction oppositely back along said path; during said operating lever reciprocal movement, transferring said first direction arcuate movement into first gear and rack means movement including arcuate movement of arcuate rack about said operating lever fixed center and in turn into single direction rotational movement of a roll to dispense a continuous web of material engaged with said roll and transferring said return direction arcuate movement into second gear and rack means movement including arcuate movement of an arcuate rack about said operating lever fixed center and in turn into the same single direction rotational movement of said roll to continue to dispense said continuous web of material; and during said operating lever reciprocal movement, transferring said operating lever first direction arcuate movement into arcuate movement of said first and second gear and rack means racks through resilient means and operating lever second direction movement into said racks through a rigid engagement.

42. A method of dispensing a continuous web of material as defined in claim 41 in which said method includes the step of reversing said operating lever reciprocal arcuate movement in said first direction at any point along said preset path and immediately moving said operating lever in said reverse return direction oppositely arcuately back along said path while still transferring said first and return direction arcuate movements into said rack arcuate movements and in turn into said single direction rotational movement of said roll throughout said operating lever and rack arcuate movements.

43. In a method of dispensing a continuous web of material, the step of: reciprocally moving an operating lever in a first direction along a preset path and in a reverse return direction oppositely back along said path; during said operating lever movement in at least said first direction, transferring said operating lever linear movement through a rack movable with said operating lever into a gear rotatable about a fixed center on said frame and in turn into single direction rotational movement of a roll to dispense a continuous web of material engaged with said roll; maintaining said continuous web of material engaged with said roll during and between said roll rotational movements; and locking said roll at the end of normal transfer of said operating lever movement to said roll single direction movement in said operating lever first direction by carrying a rigid engagement dog with said rack and engaging said dog between teeth of said gear preventing momentum of said roll from causing overrunning of said normal transfer of said movement while maintaining said roll free of said locking by maintaining said dog free of said gear teeth during said normal transfer of said movement.

44. A method of dispensing a continuous web of material as defined in claim 43 in which said step of transferring said operating lever linear movement into said single direction rotational movement of said roll includes the transferring of said operating lever linear movement into said single direction rotational movement of a dispensing roll to dispense said continuous web of material engaged with said dispensing roll and received from a supply roll; and in which said step of maintaining said continuous web of material engaged with said roll includes the maintaining of said continuous web of material engaged with said dispensing roll by constant abutment of a pressure roll against said web of material and forcing said web of material against said dispensing roll for dispensing said web of material from between said dispensing and pressure rolls during said dispensing roll single direction rotational movement.

References Cited
UNITED STATES PATENTS

| | | | |
|---|---|---|---|
| 1,421,489 | 7/1922 | Joslin | 226—157X |
| 2,045,046 | 6/1936 | Mudd | 226—142X |
| 2,485,002 | 10/1949 | Krueger | 226—128X |
| 2,783,996 | 3/1957 | Forkner | 226—145X |
| 2,830,810 | 4/1958 | Colburn et al. | 226—145X |
| 3,138,312 | 6/1964 | Newman | 226—128 |
| 3,459,353 | 8/1969 | Taylor | 226—132 |

ALLEN N. KNOWLES, Primary Examiner

U.S. Cl. X.R.

226—133, 145, 157

UNITED STATES PATENT OFFICE
CERTIFICATE OF CORRECTION

PATENT NO. : 3,606,125
DATED : September 20, 1971
INVENTOR(S) : COUNCIL A. TUCKER and JACK L. PERRIN It is certified that error appears in the above-identified patent and that said Letters Patent are hereby corrected as shown below:

Column 19, line 68 --3. A device as defined in Claim 2 in which said racks--

Column 20, line 3 --4. A device as defined in Claim 2 in which said first--

Column 20, line 29 --5. A device as defined in Claim 2 in which said first--.

Column 21, line 32 --9. A dispenser device as defined in Claim 6 in which said--

Column 28, line 36 --rotation; a rotatably mounted drive cap operably connected--

Signed and Sealed this

Twenty-second Day of February 1977

[SEAL]

Attest:

RUTH C. MASON
Attesting Officer

C. MARSHALL DANN
Commissioner of Patents and Trademarks